(12) United States Patent
Kato et al.

(10) Patent No.: US 7,123,752 B2
(45) Date of Patent: Oct. 17, 2006

(54) PERSONAL IDENTIFICATION APPARATUS AND METHOD

(75) Inventors: Yumi Kato, Tokyo (JP); Tadashi Ezaki, Tokyo (JP); Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 783 days.

(21) Appl. No.: 10/306,407

(22) Filed: Nov. 29, 2002

(65) Prior Publication Data

US 2003/0113001 A1 Jun. 19, 2003

(30) Foreign Application Priority Data

Dec. 19, 2001 (JP) ............................. 2001-385452

(51) Int. Cl.
 *G06K 9/00* (2006.01)
(52) U.S. Cl. .................................................. 382/115
(58) Field of Classification Search ................. 600/437
 See application file for complete search history.

(56) References Cited

U.S. PATENT DOCUMENTS 6,432,054 B1 *  8/2002  Ustuner et al. ............. 600/437
6,560,352 B1 *  5/2003  Rowe et al. ................ 382/115
6,628,809 B1 *  9/2003  Rowe et al. ................ 382/115
6,898,299 B1 *  5/2005  Brooks ....................... 382/115
2002/0035327 A1 *  3/2002  Kruger ....................... 600/437

* cited by examiner

Primary Examiner—Joseph Mancuso
Assistant Examiner—Robert Tarcu
(74) Attorney, Agent, or Firm—Oblon, Spivak, McClelland, Maier & Neustadt, P.C.

(57) ABSTRACT

A personal identification apparatus is disclosed by which personal identification can be performed making use of an impulse response obtained from a pulse signal transmitted by a living organism. A pulse generation section generates a pulse, and a speaker applies the pulse amplified by an amplifier to a finger of a user touching with the speaker and a microphone. The pulse signal is transmitted to the microphone with an attenuation characteristic that depends upon, for example, a transmission distance that depends upon the length and the thickness of the finger and characteristics of the living organism such as the thickness of the flesh and the bone density. A data synthesis processing section synthesizes the pulse and an impulse received by the microphone and amplified by an amplifier. A template recording section records a template to be used as a reference of discrimination in an authentication process together with a user ID and so forth. A comparison discrimination processing section refers to the template recording section to discriminate whether or not an impulse response inputted from a memory coincides with one of templates of registered users.

21 Claims, 34 Drawing Sheets

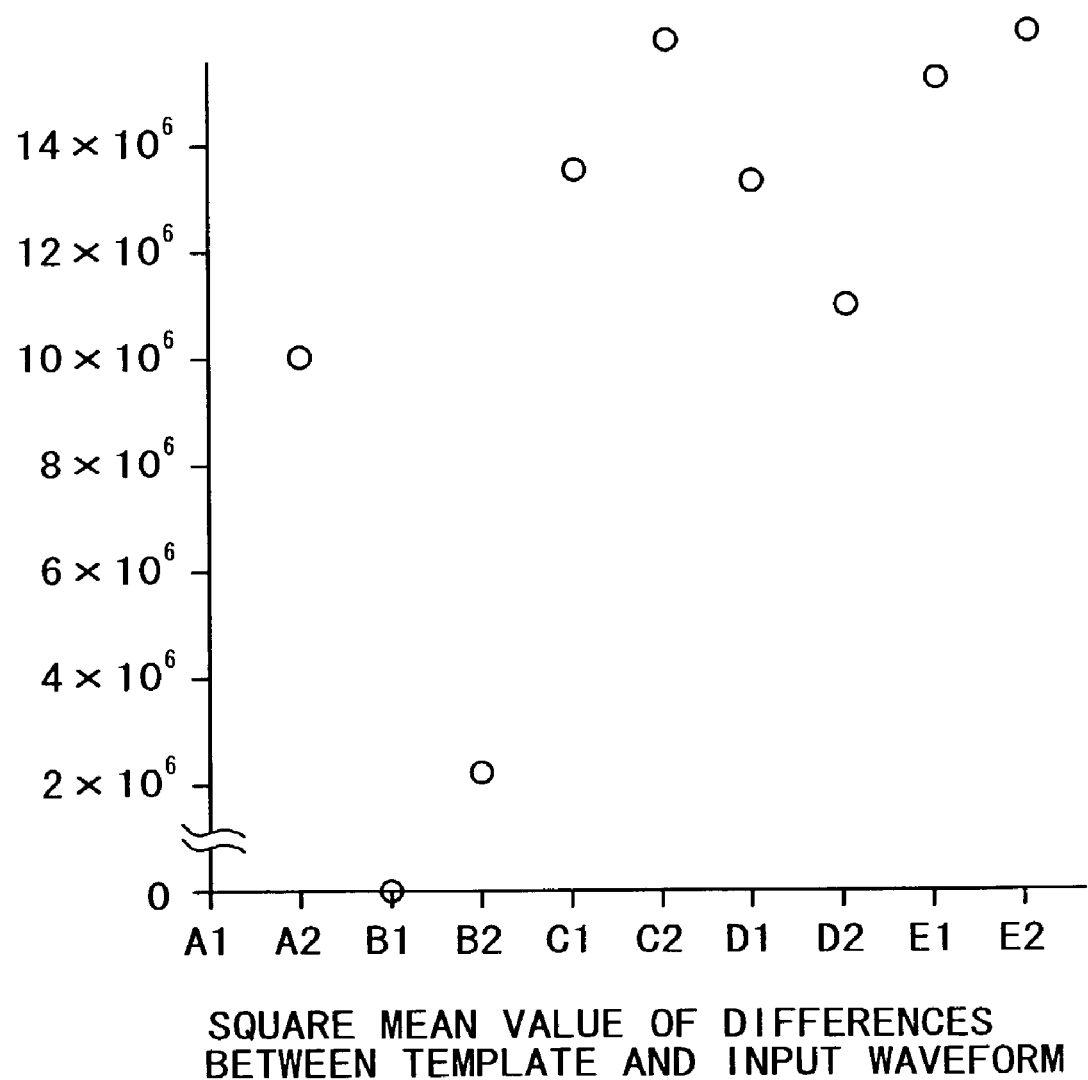

F I G. 2 1
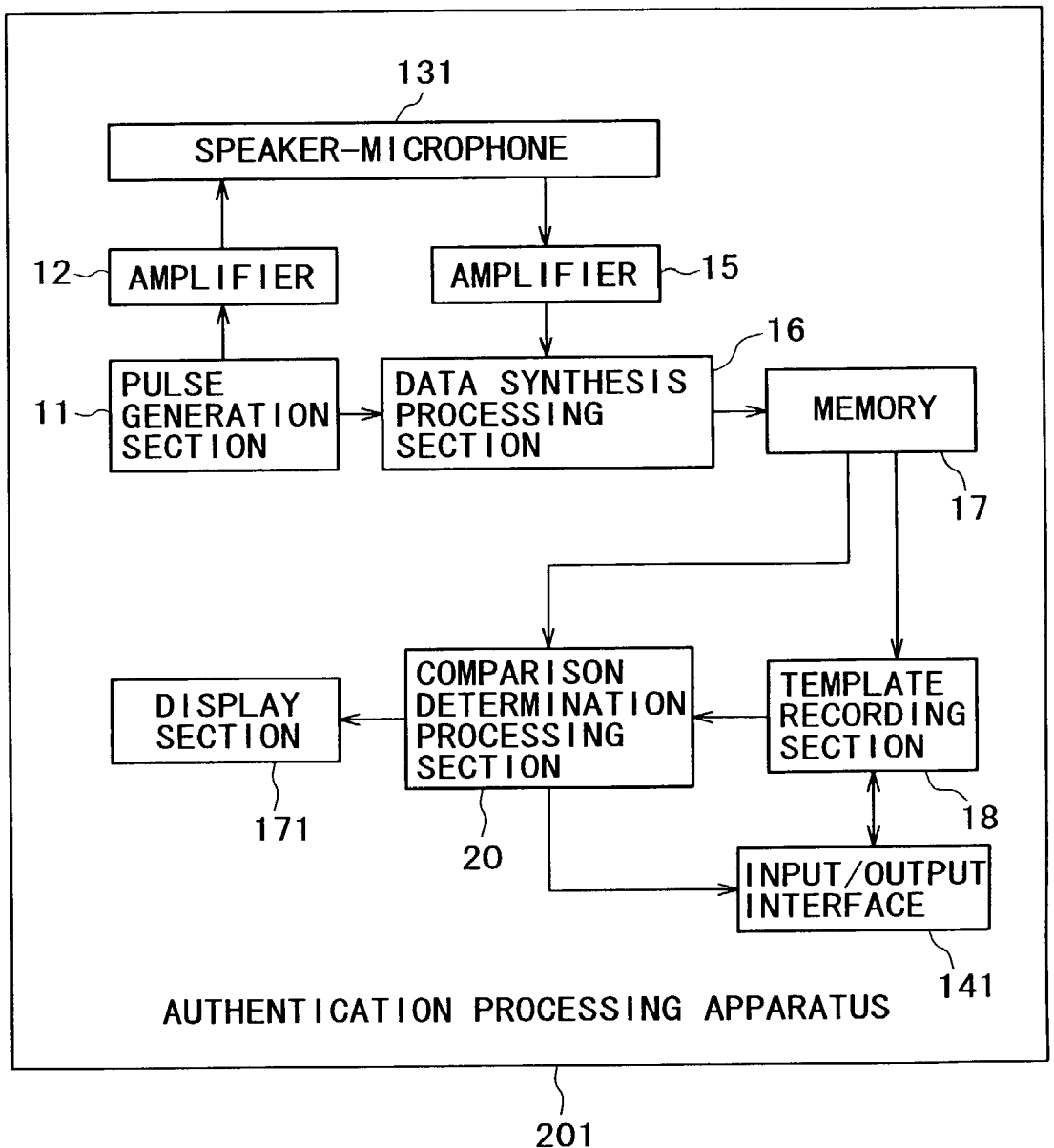

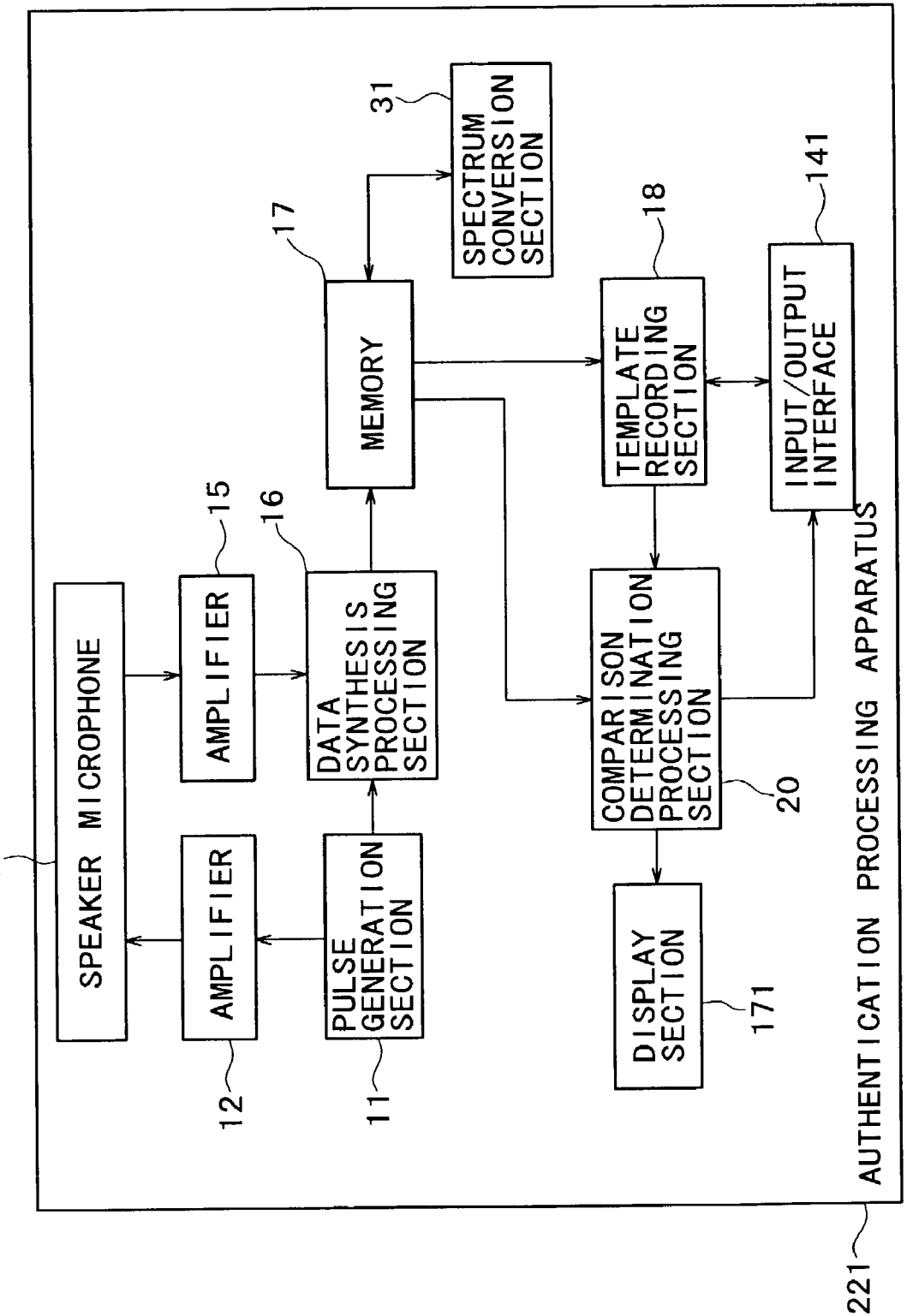

F I G. 2 9
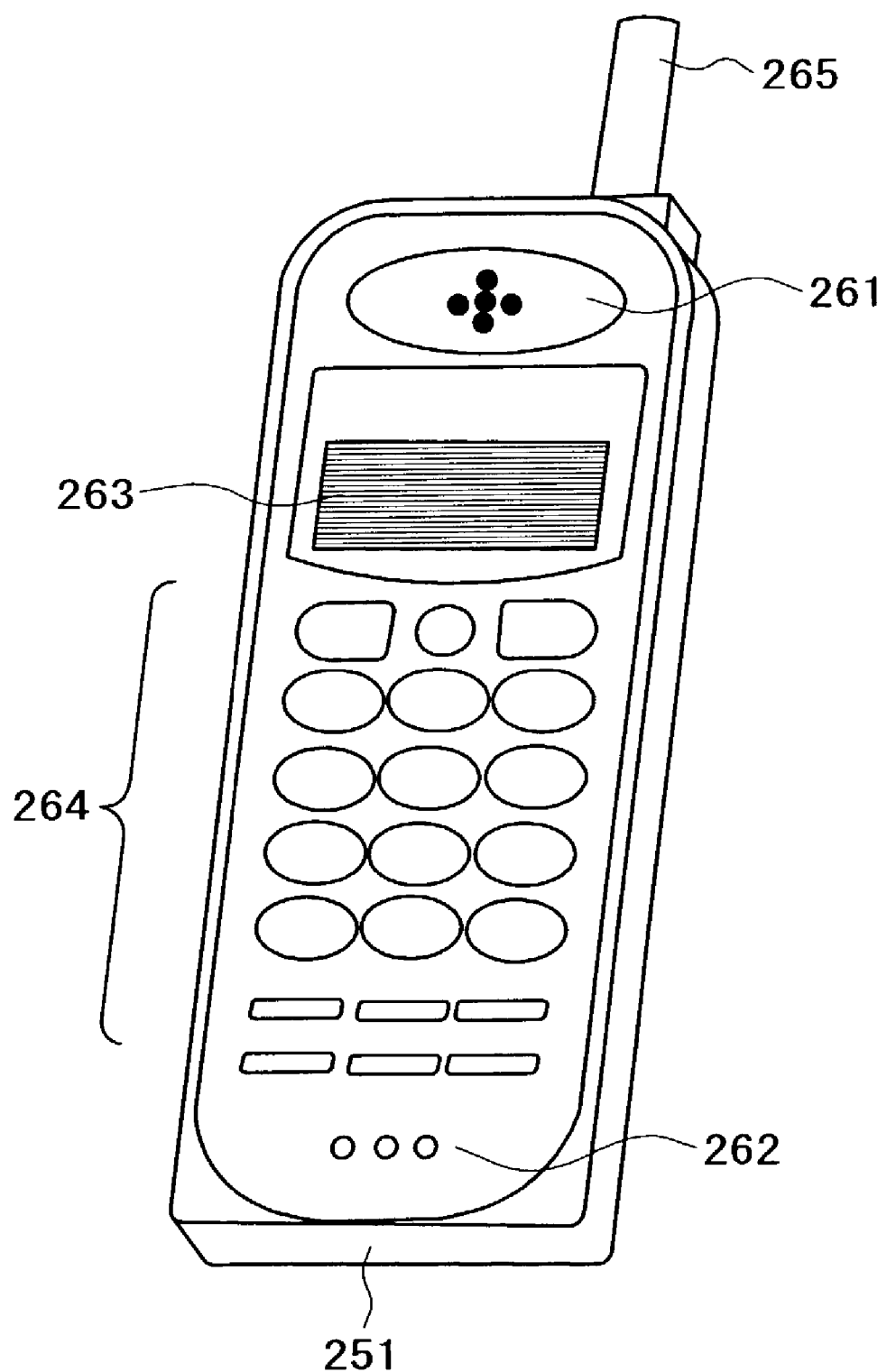

PERSONAL IDENTIFICATION APPARATUS AND METHOD

BACKGROUND OF THE INVENTION

This invention relates to a personal identification apparatus and a personal identification method, and more particularly to a personal identification apparatus and a personal identification method wherein an impulse response obtained when a pulse signal is applied to a living organism can be utilized to perform personal identification.

Conventionally, a signature, an input of a password and so forth have been used widely as a measure for identifying an individual person in order to authenticate the individual person.

However, the signature can be imitated readily, and also the password can be inputted readily by an unrelated person if it leaks once. Therefore, an impersonated unrelated person can utilize a cash card or a credit card with the signature or the password.

In order to prevent such impersonation as just mentioned, a technique for identifying an individual person making use of living organism information such as, for example, a fingerprint has been and is being developed. No doubt the living organism information cannot be imitated readily when compared with the signature or the password.

However, even in regard to an authentication process which utilizes living organism information, an example has been reported wherein image data are collected from a fingerprint remaining on a glass plate or the like and an imitated finger is produced based on the image data and authenticated successfully by a fingerprint collation apparatus sold on the market. In this manner, even if living organism information is used, impersonation may not sometimes be prevented.

SUMMARY OF THE INVENTION

It is an object of the present invention to provide a personal identification apparatus and a personal identification method by which personal identification can be performed making use of an impulse response obtained when a pulse signal is applied to a living organism without imposing complicated operations on a user.

In order to attain the object described above, according to an aspect of the present invention, there is provided a personal identification apparatus for performing a process of identifying a person, including generation means for generating a pulse signal, first outputting means for outputting the pulse signal generated by the generation means, and reception means for receiving an impulse obtained when the pulse signal outputted from the first outputting means is transmitted through a living organism of a user.

The first outputting means and the reception means may be configured so that part of the living organism of the user can be held therebetween.

Alternatively, the first outputting means and the reception means may be provided on the same plane so that part of the living organism of the user can touch simultaneously therewith.

As another alternative, the first outputting means and the reception means may be provided on a common probe-like member.

As a further alternative, the first outputting means and the reception means may be formed as a unitary member of a flattened configuration.

The personal identification apparatus may further include production means for synthesizing the pulse signal generated by the generation means and the impulse received by the reception means to produce a composite wave.

The personal identification apparatus may further include second outputting means for outputting the composite wave produced by the production means.

The personal identification apparatus may further include inputting means for inputting information for identifying a registered user, recording means for recording the information inputted by the inputting means for identifying the registered user and a first composite wave produced by the production means in a coordinated relationship with each other, comparison means for comparing the first composite wave recorded by the recording means in advance and corresponding to the registered user and a second composite wave produced by the production means with each other, and second outputting means for outputting a result of the comparison by the comparison means.

In this instance, the comparison means may compare attenuation characteristics of the first composite wave recorded by the recording means in advance and corresponding to the registered user and the second composite wave produced by the production means with each other using the pulse signal as a reference for a time axis.

The comparison means may arithmetically operate a square mean value of differences in amplitude between the first composite wave corresponding to the registered user and the second composite wave produced by the production means to compare the attenuation characteristics with each other.

Alternatively, the comparison means may compare frequency characteristics of the first composite wave recorded by the recording means in advance and corresponding to the registered user and the second composite wave produced by the production means with each other.

The personal identification apparatus may be configured such that it further includes spectrum conversion means for executing spectrum conversion of the composite wave produced by the production means after each predetermined unit interval of time, and that the recording means further records the information inputted by the inputting means for identifying the registered user and a first spectrum conversion result obtained by the spectrum conversion executed for the first composite wave by the spectrum conversion means in a coordinated relationship with each other, and the comparison means compares the first spectrum conversion result recorded in advance by the recording means and a second spectrum conversion result obtained by the spectrum conversion executed for the second composite waveform by the spectrum conversion means with each other to compare frequency characteristics of the first composite wave corresponding to the registered user and the second composite wave produced by the production means with each other.

According to another aspect of the present invention, there is provided a personal identification method for a personal identification apparatus which performs a process of identifying a person, including a generation controlling step of controlling generation of a pulse signal, an outputting controlling step of controlling outputting of the pulse signal whose generation is controlled by processing of the generation controlling step, and a reception controlling step of controlling reception of an impulse obtained when the pulse signal whose outputting is controlled by processing of the outputting controlling step is transmitted through a living organism of a user.

According to a further aspect of the present invention, there is provided a program storage medium on which a computer-readable program for a personal identification apparatus which performs a process of identifying a person is recorded, the program including a generation controlling step of controlling generation of a pulse signal, an outputting controlling step of controlling outputting of the pulse signal whose generation is controlled by processing of the generation controlling step, and a reception controlling step of controlling reception of an impulse obtained when the pulse signal whose outputting is controlled by processing of the outputting controlling step is transmitted through a living organism of a user.

According to a still further aspect of the present invention, there is provided a program which can be executed by a computer for controlling a personal identification apparatus which performs a process of identifying a person, the program including a generation controlling step of controlling generation of a pulse signal, an outputting controlling step of controlling outputting of the pulse signal whose generation is controlled by processing of the generation controlling step, and a reception controlling step of controlling reception of an impulse obtained when the pulse signal whose outputting is controlled by processing of the outputting controlling step is transmitted through a living organism of a user.

According to a yet further aspect of the present invention, there is provided an information processing apparatus for performing a process of identifying a person based on acquired information, including acquisition means for acquiring a composite wave of an impulse obtained by applying a pulse signal to a living organism of a user and the pulse signal, inputting means for inputting information for identifying a registered user, recording means for recording the information inputted by the inputting means for identifying the registered user and a first composite wave acquired by the acquisition means in a coordinated relationship with each other, comparison means for comparing the first composite wave recorded by the recording means in advance and corresponding to the registered user and a second composite wave acquired by the acquisition means with each other, and outputting means for outputting a result of the comparison by the comparison means.

The comparison means may compare attenuation characteristics of the first composite wave recorded by the recording means in advance and corresponding to the registered user and the second composite wave acquired by the acquisition means with each other using the pulse signal as a reference for a time axis.

As an alternative, the comparison means may arithmetically operate a square mean value of differences in amplitude between the first composite wave corresponding to the registered user and the second composite wave acquired by the acquisition means to compare the attenuation characteristics with each other.

As a further alternative, the comparison means may compare frequency characteristics of the first composite wave recorded by the recording means in advance and corresponding to the registered user and the second composite wave acquired by the acquisition means with each other.

The information processing apparatus may be configured such that it further includes spectrum conversion means for executing spectrum conversion of the composite wave acquired by the acquisition means after each predetermined unit interval of time, and that the recording means further records the information inputted by the inputting means for identifying the registered user and a first spectrum conversion result obtained by the spectrum conversion executed for the first composite wave by the spectrum conversion means in a coordinated relationship with each other, and the comparison means compares the first spectrum conversion result recorded in advance by the recording means and a second spectrum conversion result obtained by the spectrum conversion executed for the second composite waveform by the spectrum conversion means with each other to compare frequency characteristics of the first composite wave corresponding to the registered user and the second composite wave acquired by the acquisition means with each other.

According to a yet further aspect of the present invention, there is provided a personal identification system, including a first information processing apparatus for acquiring information for executing personal identification, and a second information apparatus for executing a personal identification process based on the information acquired by the first information processing apparatus, the first information processing apparatus including generation means for generating a pulse signal, first outputting means for outputting the pulse signal generated by the generation means, reception means for receiving an impulse obtained when the pulse signal outputted from the first outputting means is transmitted through a living organism of a user, production means for synthesizing the pulse signal generated by the generation means and the impulse received by the reception means to produce a composite wave, and second outputting means for outputting the composite wave produced by the production means, the second information processing apparatus including acquisition means for acquiring the composite wave outputted by the second outputting means, inputting means for inputting information for identifying a registered user, recording means for recording the information inputted by the inputting means for identifying the registered user and a first composite wave acquired by the acquisition means in a coordinated relationship with each other, comparison means for comparing the first composite wave recorded by the recording means in advance and corresponding to the registered user and a second composite wave acquired by the acquisition means with each other, and third outputting means for outputting a result of the comparison by the comparison means.

With the personal identification apparatus, personal identification method, program storage medium, program, information processing apparatus and personal identification system described above, information regarding a living organism can be obtained, and particularly, in order to perform a personal identification process, information regarding a living organism which cannot be imitated readily can be acquired. Further, a personal identification process can be performed, and particularly, a personal identification process can be performed using information regarding a living organism which cannot be imitated readily, and besides, a personal identification process can be performed with certainty using information regarding a living organism which cannot be imitated readily without imposing a complicated process on the user. Furthermore, a result of a personal identification can be used to discriminate whether or not a process should be performed, and particularly, a personal identification process can be performed upon ordinary operation inputting without causing the user to perform a special operation to limit use of the apparatus by a user who is not registered. Further, information necessary for personal identification can be acquired, and particularly, information necessary for personal identification can be acquired through a touch of the user without causing the user to perform a special operation. In addition, a result of personal identification can be used to discriminate whether or not a process should be performed, and particularly, if, when a recording medium is loaded or upon ordinary operation inputting, a personal identification process is performed without causing the user to perform a special operation and the user who has performed the operation input is a user who is not a registered user, or if the user who has loaded the recording medium and the user who has performed the operation input are different from each other, use of the apparatus can be limited.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 8 is a diagram illustrating a square mean value of differences between templates and an input waveform by the authentication processing apparatus of FIG. 1;

FIG. 21 is a block diagram showing a configuration of an authentication processing section provided in a video cassette tape shown in FIG. 19;

FIG. 22 is a block diagram showing another configuration of the authentication processing section provided in the video cassette tape shown in FIG. 19;

FIG. 29 is a perspective view showing an appearance of a digital potable telephone set to which the present invention is applied;

DETAILED DESCRIPTION OF THE PREFERRED EMBODIMENTS

Figure 1:
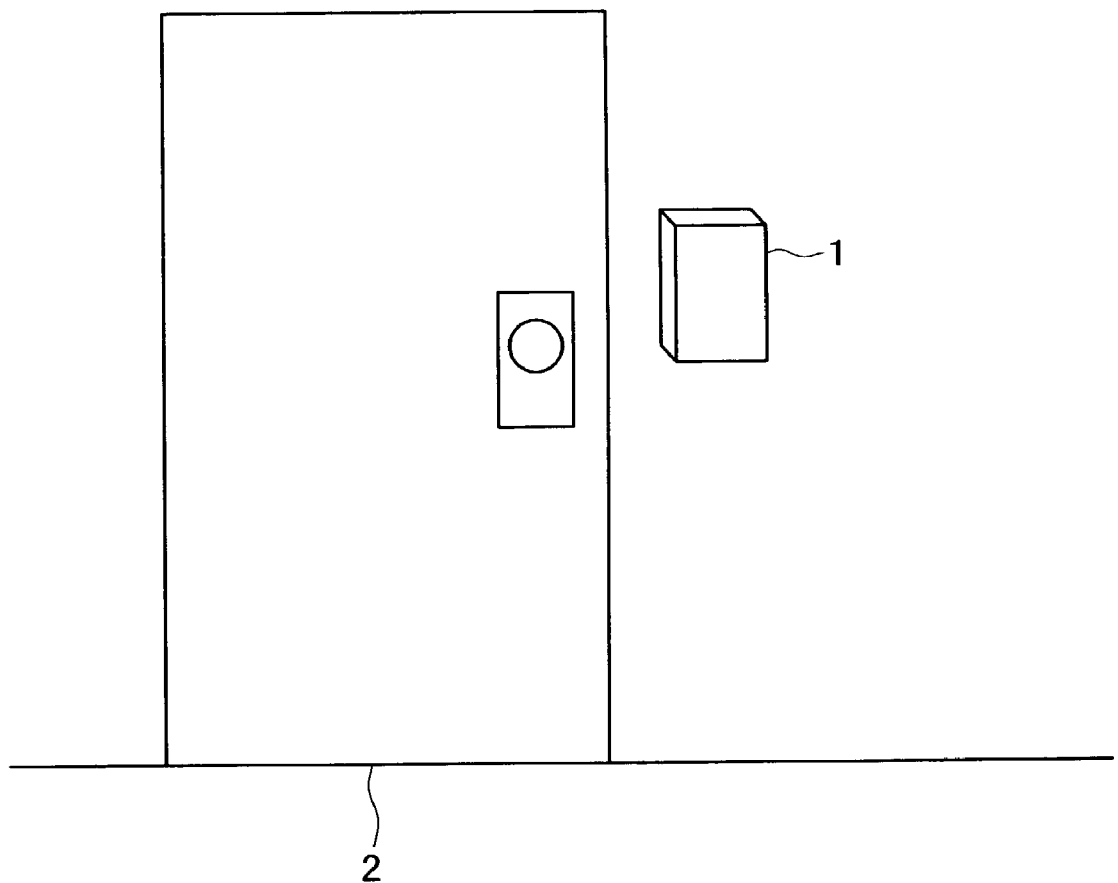
FIG. 1 is a schematic view showing an authentication processing apparatus to which the present invention is applied.

Referring first to FIG. 1, there is shown an authentication processing apparatus for use for entrance control as a first embodiment of the present invention.

The authentication processing apparatus 1 typically applies a pulse signal to a finger of a user touching therewith and performs a personal identification process based on an impulse response obtained from transmission of the pulse signal through the living organism including transmission through the bone and then outputs a result of the personal identification to an actuator or the like for operating a lock of a door 2 to control opening/closing of the door 2. In short, the authentication processing apparatus 1 performs a process of authenticating a user who can enter through the door 2.

Figure 2:
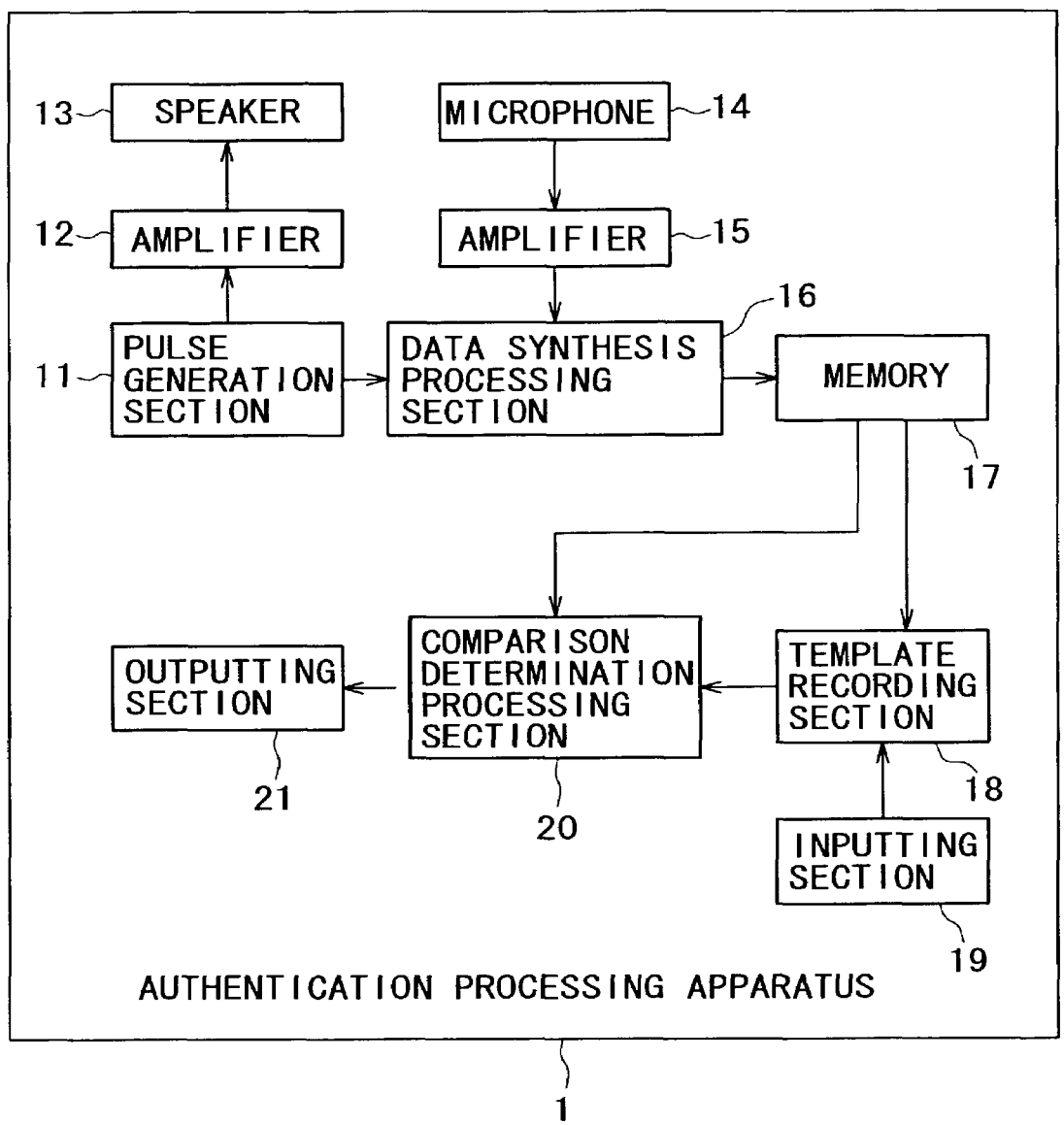
FIG. 2 is a block diagram showing a configuration of the authentication processing apparatus of FIG. 1.

Referring now to FIG. 2, there is shown a configuration of the authentication processing apparatus 1.

A pulse generation section 11 generates a pulse signal of a predetermined amplitude and outputs it to an amplifier 12 and a data synthesis section 16. The amplifier 12 amplifies the pulse signal inputted thereto and outputs the amplified pulse signal to a speaker (transducer) 13.

The user touches at a finger or the like thereof with the speaker 13 and a microphone 14. The speaker 13 outputs the amplified pulse signal inputted from the amplifier 12, that is, applies the amplified pulse signal to the finger or the like of the user.

Figure 3A:
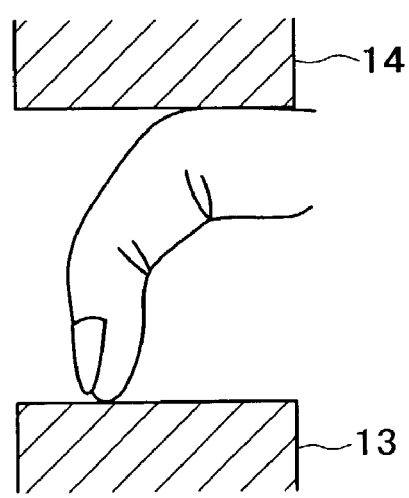
FIGS. 3A to 3D are schematic views illustrating a positional relationship among a microphone, a speaker and a finger of a user of the authentication processing apparatus of FIG. 1.
Figure 3B:
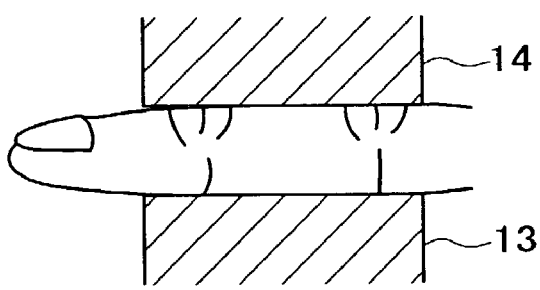

The touching of the finger or the like of the user with the speaker 13 and microphone 14 may be performed in any manner depending upon the configuration, installation place and so forth of the authentication processing apparatus 1. The speaker 13 and the microphone 14 may be disposed such that, for example, the user touches at two points of a finger thereof spaced by a fixed distance from each other with the speaker 13 and the microphone 14 as seen in FIG. 3A or a finger of the user is held by and between the speaker 13 and the microphone 14 as seen in FIG. 3B. Where the speaker 13 and the microphone 14 are configured in such a manner as shown in FIG. 3A or 3B, they may be mounted for adjustment in position therebetween so that the position of the finger or the like of the user with respect to the speaker 13 and the microphone 14 can be adjusted. Where the speaker 13 and the microphone 14 are configured in such a manner as shown in FIG. 3A or 3B, the speaker 13 and microphone 14 and part of the body or living organism of the user can contact with each other with certainty.

Figure 3C:
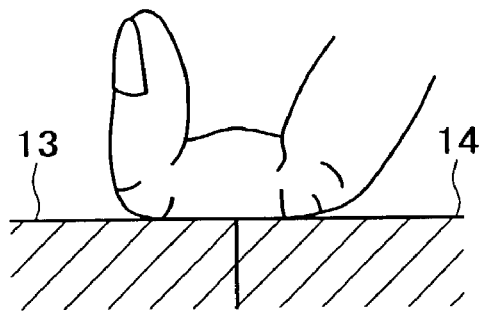
Figure 3D:
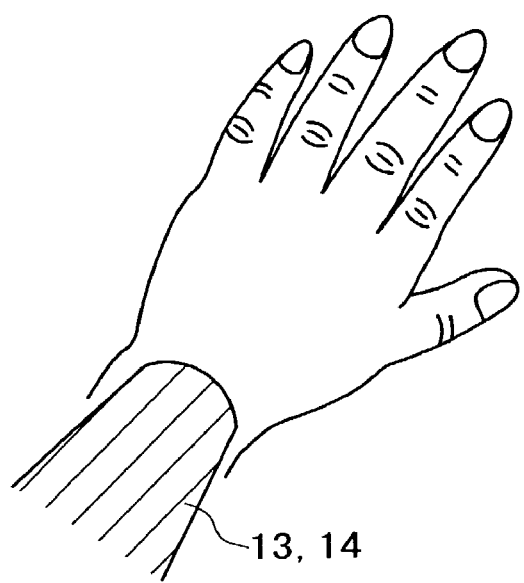

Alternatively, for example, the speaker 13 and the microphone 14 may be juxtaposed on a common plane so that the user can touch at a finger thereof with both of them as seen in FIG. 3C. As another alternative, the speaker 13 and the microphone 14 may be formed as a probe and applied to a predetermined position of a hand or the like of the user as seen in FIG. 3D. Where the speaker 13 and the microphone 14 are configured in such a manner as seen in FIG. 3C or 3D, the user can touch at part of the body or living organism thereof with the speaker 13 and the microphone 14 with certainty without the necessity for complicated positioning.

It is to be noted that a speaker-microphone wherein the speaker 13 and the microphone 14 are formed as a unitary member of a flattened shape may otherwise be used in a similar manner as seen in FIG. 3C or 3D.

A pulse signal generated by the speaker 13 is transmitted to the microphone 14 with an attenuation characteristic which depends, for example, upon the transmission distance to the microphone 14, which in turn depends upon the length and the thickness of the finger, and characteristics of the living organism such as the thickness of the flesh and the bone density of the user.

While it is shown in FIGS. 3A to 3D that the user touches at a finger or hand thereof with the speaker 13 and the microphone 14, naturally the speaker 13 and the microphone 14 may be configured otherwise such that the user touches at any other portion of the body or living organism thereof than a finger or a hand with the speaker 13 and the microphone 14.

The microphone 14 receives an input of an impulse response obtained when the pulse signal outputted from the speaker 13 comes to the finger or the like of the user and is transmitted through the living organism including the bone and outputs the received impulse response to an amplifier 15. The amplifier 15 amplifies and outputs the inputted impulse to the data synthesis section 16.

The data synthesis section 16 synthesizes the pulse signal inputted from the pulse generation section 11 and the amplified impulse inputted from the amplifier 15 and outputs a resulting signal to a memory 17. The memory 17 temporarily stores the inputted composite waveform signal and outputs the stored composite waveform signal to a template recording section 18 upon execution of user registration (when the signal inputted is a template to be used as a reference for an authentication process), but outputs the stored composite waveform signal to a comparison discrimination processing section 20 upon execution of an authentication process (when the inputted signal is detection data with regard to which an authentication process is to be performed).

Upon user registration, the template recording section 18 reads a composite waveform signal from the memory 17 and records the composite waveform signal together with information of, for example, a user name and a user ID inputted from an inputting section 19 as a template which is a signal of a reference to be used for determination in an authentication process. The template recording section 18 may have a plurality of templates recorded therein for one registered user. Where a plurality of templates are recorded in the template recording section 18, if the comparison discrimination processing section 20 uses all of the templates in an authentication process, then a high degree of accuracy in authentication can be anticipated although a long period of time is required for the process.

When the comparison discrimination processing section 20 executes an authentication process, it reads a composite waveform signal from the memory 17 and refers to the templates recorded in the template recording section 18 to discriminate whether or not the inputted pulse response coincides with one of the templates of registered users. Then, the comparison discrimination processing section 20 outputs a result of the discrimination to an outputting section 21.

The outputting section 21 receives the discrimination result as an input thereto and outputs an authentication process result to the actuator for operating the lock of the door 2. The actuator opens or closes the door 2 based on the inputted discrimination result.

While the authentication processing apparatus 1 is shown used for entrance management in FIG. 1, it can be used also for any other authentication process. In this instance, the outputting section 21 outputs the discrimination result of the authentication process, for example, as a text to a display unit so that the discrimination result may be displayed on the display unit or to a speaker so that the discrimination result may be outputted as sound, or drives a predetermined LED (light emitting diode) to be lit or extinguished based on the discrimination result, or else outputs the discrimination result to some other apparatus such as a personal computer.

Now, a bone transmission identification process executed by the authentication processing apparatus 1 is described with reference to a flow chart of FIG. 4.

Figure 5:
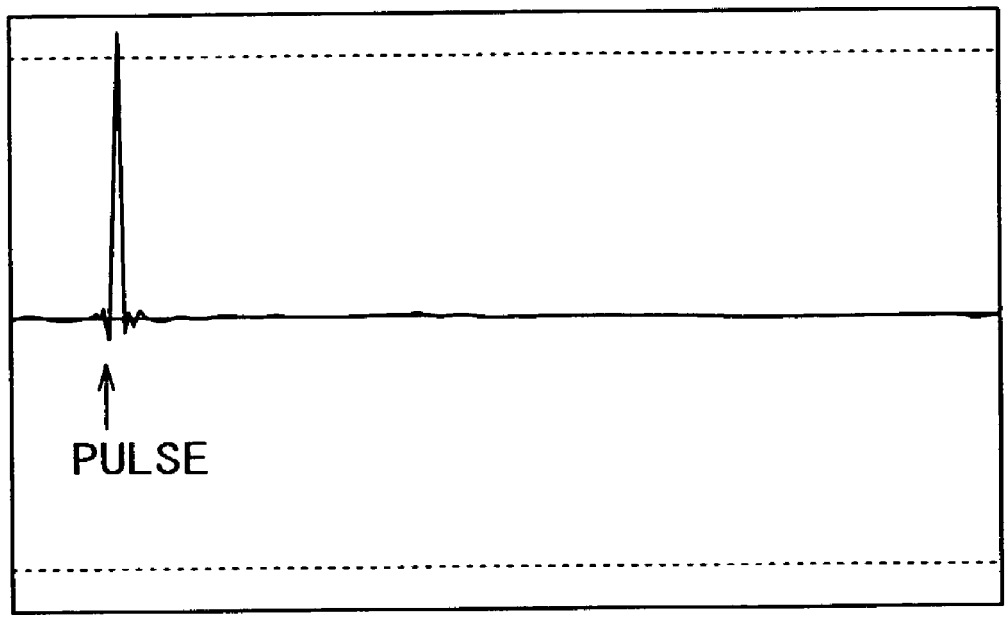
FIG. 5 is a diagram illustrating a pulse signal generated by the authentication processing apparatus of FIG. 1.

At step S1, the pulse generation section 11 generates, for example, such a pulse signal as shown in FIG. 5 and outputs the pulse signal to the amplifier 12 and the data synthesis section 16.

At step S2, the amplifier 12 receives an input of the pulse signal generated at step S1, amplifies the received pulse signal and outputs the amplified pulse signal to the speaker 13.

At step S3, the speaker 13 outputs the amplified pulse signal inputted thereto. Since a finger or the like of the user is in contact with the speaker 13 and the microphone 14 as shown in FIG. 3A, 3B, 3C or 3D, the amplified pulse signal outputted from the speaker 13 is transmitted through the living organism of the user to the microphone 14.

At step S4, the microphone 14 receives an input of an impulse response from the living organism of the user and outputs the impulse to the amplifier 15.

At step S5, the amplifier 15 amplifies the impulse and outputs the amplified impulse to the data synthesis section 16.

Figure 6:
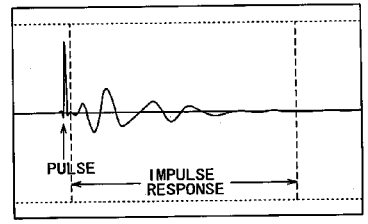
FIG. 6 is a diagram illustrating a composite waveform signal produced by synthesis of the pulse signal of FIG. 5 and an impulse response in the authentication processing apparatus of FIG. 1.

At step S6, the data synthesis section 16 synthesizes the amplified impulse and the generated pulse signal as seen in FIG. 6 and outputs a resulting composite signal to the memory 17. The generated pulse synthesized with the impulse is used as a reference of the time axis upon collation between a template and acquired data.

At step S7, the memory 17 stores the composite waveform inputted thereto.

At step S8, the template recording section 18 and the comparison discrimination processing section 20 discriminate whether or not an authentication process is being executed.

If it is discriminated at step S8 that an authentication process is not being executed, then since a user recording process is being executed, the template recording section 18 reads, at step S9, the composite waveform from the memory 17 and stores the composite waveform together with user information such as, for example, a user name and a user ID inputted from the inputting section 19 as a composite waveform template. The processing is ended therewith.

Figure 7A:
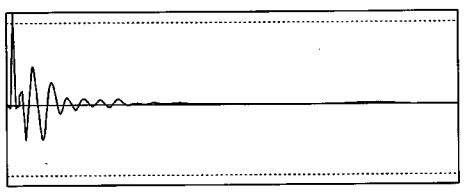
FIGS. 7A to 7C are diagrams illustrating composite waveform signals recorded as templates in the authentication processing apparatus of FIG. 1.
Figure 7B:
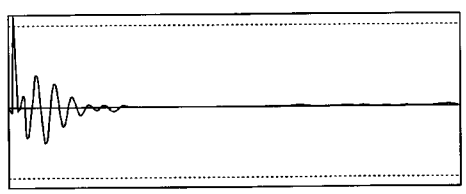
Figure 7C:
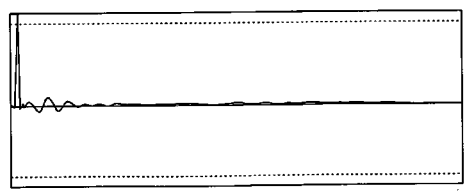

The composite waveform stored as a template in the template recording section 18 differs among different users as seen in FIGS. 7A, 7B and 7C.

If it is discriminated at step S8 that an authentication process is being executed, then the comparison discrimination processing section 20 reads, at step S10, the composite waveform from the memory 17 and compares the composite waveform with the composite waveform templates recorded in the template recording section 18 to execute an identification process. Then, the comparison discrimination processing section 20 outputs a result of the identification process to the outputting section 21.

The comparison discrimination processing section 20 can typically compare the attenuation characteristics of the inputted composite waveform and the composite waveform templates recorded in the template recording section 18 with each other to execute an identification process. For example, if two composite waveform templates are registered for each registered user in the template recording section 18, then the comparison discrimination processing section 20 calculates a square mean value of differences between the inputted waveform and the templates.

A square mean value of differences between an inputted waveform and templates is described with reference to FIG. 8. As seen in FIG. 8, a square mean value of differences between an inputted waveform and templates of different registered users is a very high value (in FIG. 8, greater than $10^6$ point), and therefore, the different registered users can be identified readily. Then, when the calculated square mean value is lower than a predetermined value, it is determined that the inputted waveform coincides with a template of the corresponding user (in FIG. 8, the user B).

At step S11, the outputting section 21 outputs the inputted identification result, for example, to a predetermined display section, speaker or LED driver or some other apparatus. The processing is ended therewith.

Although it is described above that an impulse response obtained and all of the templates recorded in the template recording section 18 are compared with each other, for example, upon starting of an authentication process, a user with regard to whom a personal identification process is to be performed may be urged to use the inputting section 19 to input a user ID thereof. In this instance, templates of the corresponding user ID are extracted from the template recording section 18, and a personal identification process is executed based on whether or not the square mean value of differences between the extracted templates and the obtained impulse response is lower than a predetermined threshold value. This decreases the processing time required for the personal identification.

Figure 9:
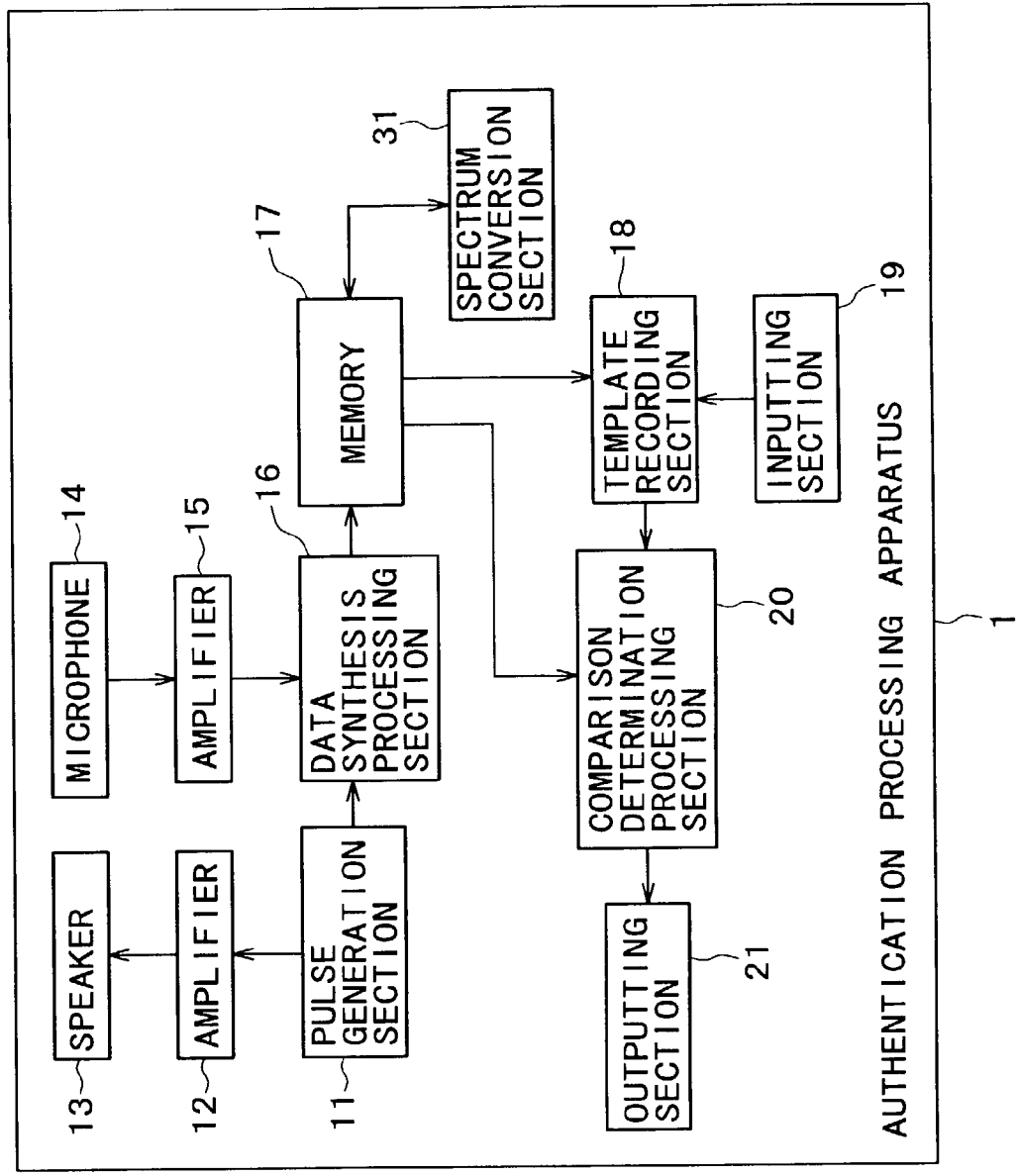
FIG. 9 is a block diagram showing a configuration of a modified authentication processing apparatus wherein a spectrum is used for an authentication process.

While, in the process described above, identification of a user is executed by comparison of an attenuation characteristic of an input waveform, it is otherwise possible to further provide, for example, as shown in FIG. 9, a spectrum conversion section 31 which performs spectrum conversion after each predetermined unit interval of time for the composite waveform stored in the memory 17 and use a resulting frequency characteristic to identify the user.

It should be noted that the same component elements as those in FIG. 2 are denoted by the same symbols as those in FIG. 9 and the description will be omitted suitably.

Figure 10A:
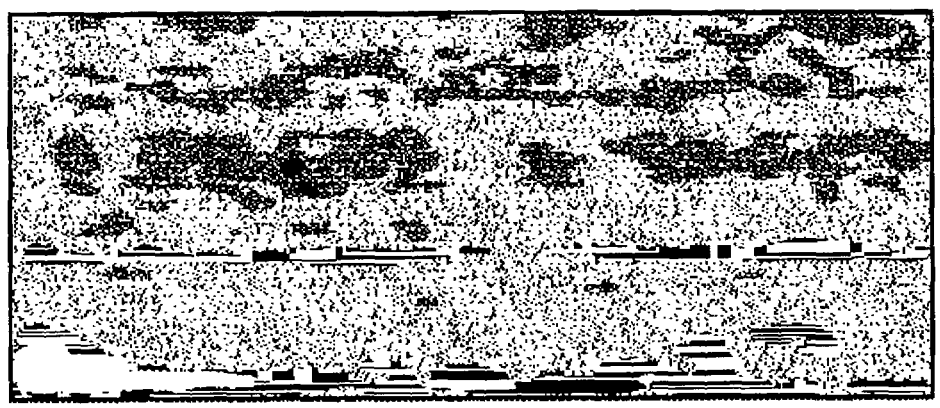
FIGS. 10A to 10C are schematic views showing different spectra.
Figure 10B:
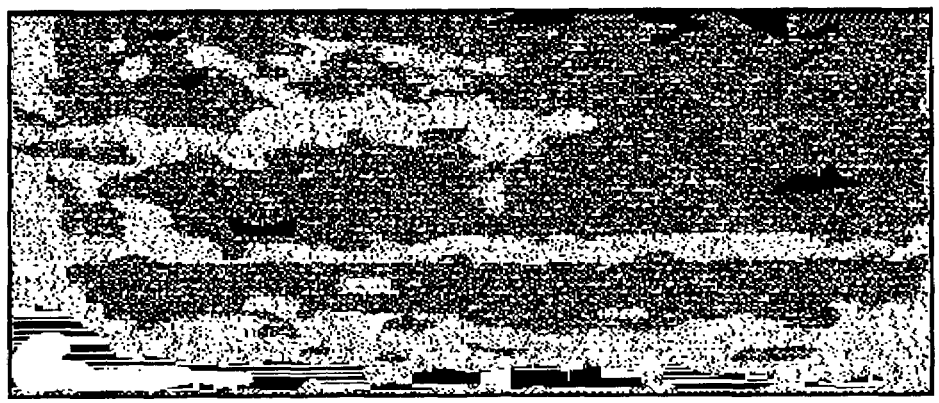
Figure 10C:

The spectrum conversion section 31 spectrum converts the waveform stored in the memory 17 after each predetermined unit interval of time and outputs a result of the spectrum conversion (hereinafter referred to as spectrum data) back to the memory 17. The spectrum data of the memory 17 is read to one of the template recording section 18 and the comparison discrimination processing section 20 depending upon whether the processing being executed is a user registration process or an authentication process. Several examples of the spectrum data are illustrated in FIGS. 10A, 10B and 10C. As seen in FIGS. 10A to 10C, the spectrum data indicates different characteristics among different users.

Then, upon execution of an authentication process, the comparison discrimination processing section 20 compares the spectrum data read from the memory 17 and the spectrum data recorded as templates in the template recording section 18 in terms of, for example, the position at which the spectrum exhibits a maximum value or the color distribution to identify the user, and outputs a result of the identification to the outputting section 21.

It is otherwise possible to register both of a composite waveform signal and spectrum data obtained by conversion of the spectrum conversion section 31 as a template into the template recording section 18. In this instance, the comparison discrimination processing section 20 reads out a composite waveform signal and spectrum data obtained by conversion of the spectrum conversion section 31 from the memory 17 and compares both of them with such templates to obtain an identification result.

Figure 11:
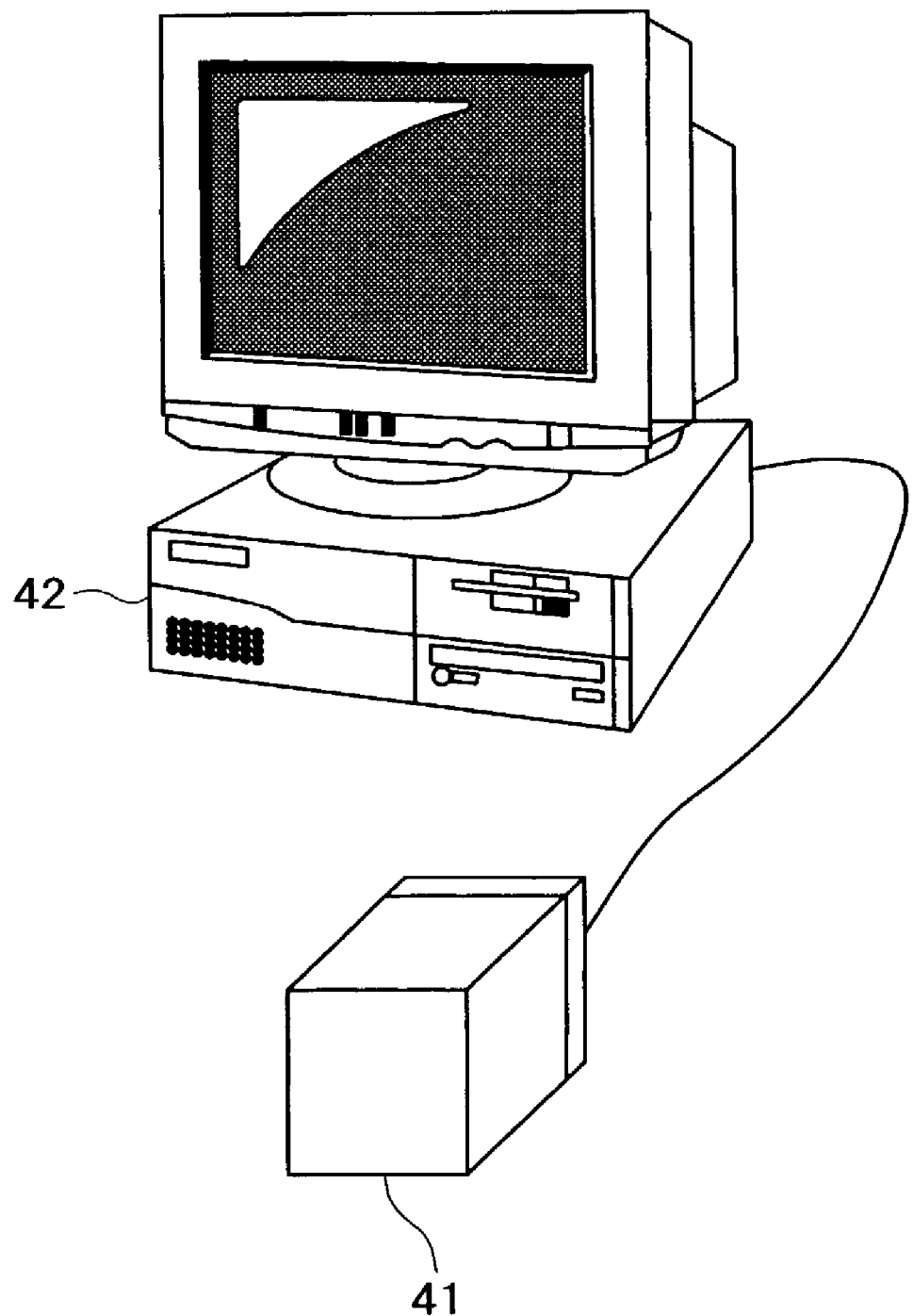
FIG. 11 is a schematic view showing another authentication processing apparatus to which the present invention is applied.

Now, a second embodiment of the present invention is described with reference to FIG. 11. In the second embodiment, an authentication processing apparatus 41 and a personal computer 42 are used as seen in FIG. 11.

The authentication processing apparatus 41 is connected to the personal computer 42 and configured such that the user can touch at a finger or the like thereof with the authentication processing apparatus 41 in such a manner as described hereinabove with reference to FIG. 3A, 3B, 3C or 3D similarly with the authentication processing apparatus 1 of FIG. 1. The personal computer 42 executes an authentication process based on a signal inputted thereto from the authentication processing apparatus 41 and displays a result of the authentication process.

Figure 12:
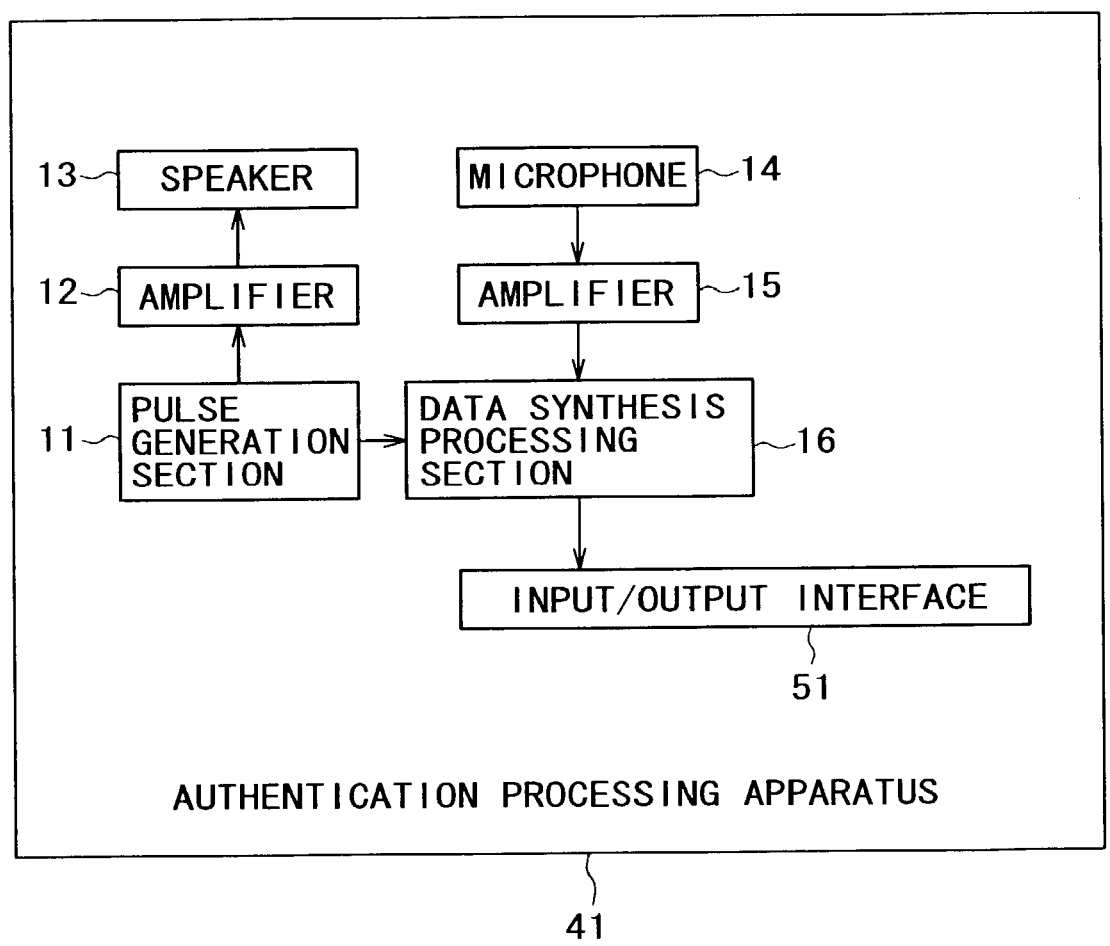
FIG. 12 is a block diagram showing a configuration of the authentication processing apparatus of FIG. 11.

FIG. 12 shows a configuration of the authentication processing apparatus 41.

Referring to FIG. 12, the authentication processing apparatus 41 shown includes a pulse generation section 11, an amplifier 12, a speaker 13, a microphone 14, a amplifier 15 and a data synthesis section 16 similar to those of the authentication processing apparatus 1 described hereinabove with reference to FIG. 2, and further includes an input/ output interface 51 for outputting a signal outputted from the data synthesis section 16 to the personal computer 42.

The components 11 to 16 of the authentication processing apparatus 41 operate similarly to those of the authentication processing apparatus 1 described hereinabove with reference to FIG. 2, and also the speaker 13 and the microphone 14 are configured similarly to those described hereinabove with reference to FIG. 3A to 3C. Therefore, overlapping description of the components 11 to 16 is omitted herein to avoid redundancy.

Figure 13:
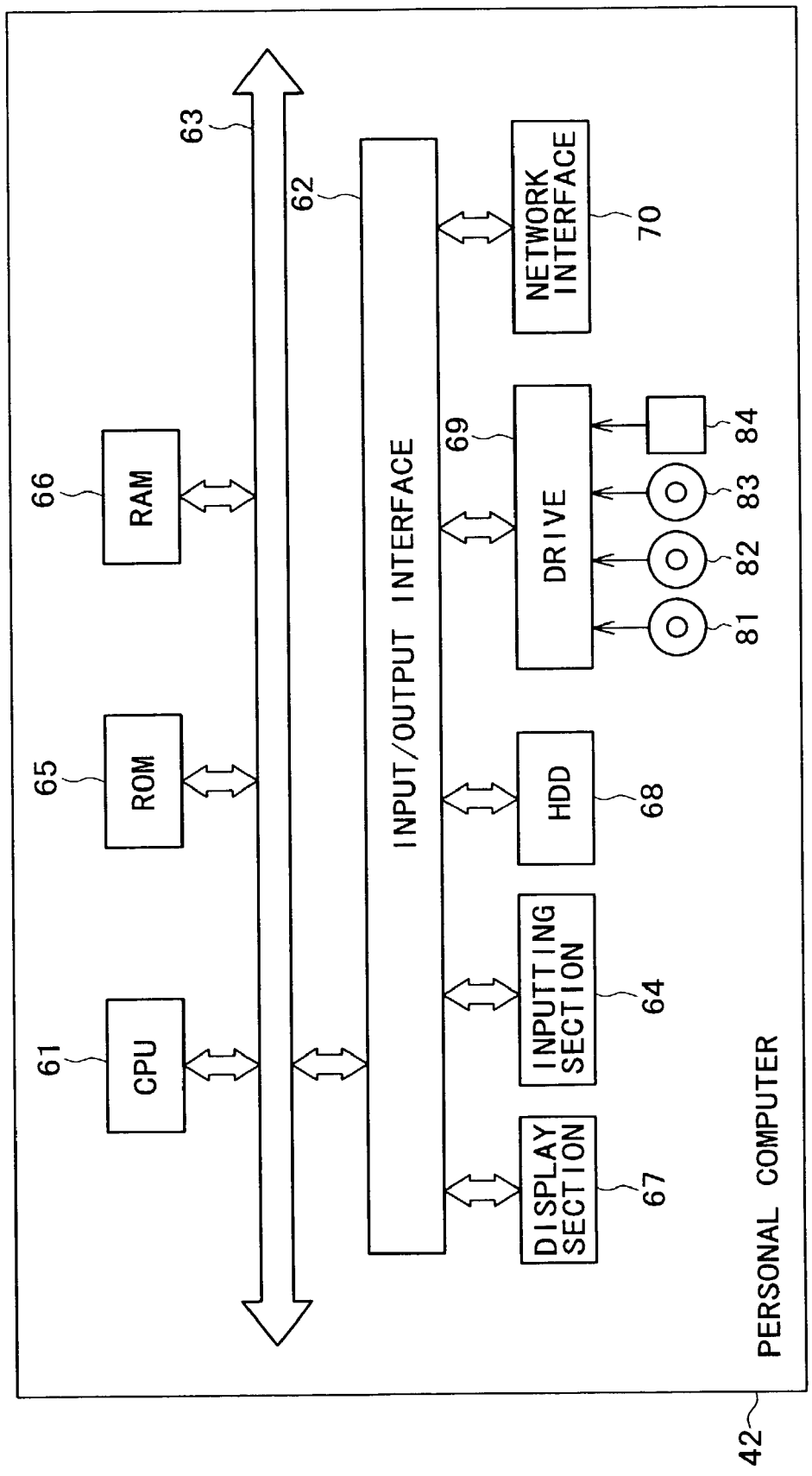
FIG. 13 is a block diagram showing a configuration of a personal computer shown in FIG. 11.

FIG. 13 shows a configuration of the personal computer 42.

Refer to FIG. 13, a central processing unit (CPU) 61 receives signals corresponding to various instructions inputted by a user of the personal computer 42 using an inputting section 64 through an input/output interface 62 and an internal bus 63 and signals inputted from the authentication processing apparatus 41 through a network interface 70, and executes various processes based on the received signals.

A read only memory (ROM) 65 stores basically fixed data from among programs and parameters for arithmetic operation to be used by the CPU 61. A random access memory (RAM) 66 stores programs and data to be used in execution of the CPU 61, parameters which suitably vary during the execution and so forth. The CPU 61, ROM 65 and RAM 66 are connected to each other by the internal bus 63.

The internal bus 63 is connected also to the input/output interface 62. The inputting section 64 may include, for example, a keyboard, a touch pad, a jog dial and/or a mouse and is operated when the user of the personal computer 42 inputs various instructions to the CPU 61. A display section 67 may be, for example, a cathode ray tube (CRT) or a liquid crystal display unit and display various kinds of information in the form of a text, an image or the like.

A hard disk drive (HDD) 68 drives hard disks and records or reproduces a program to be executed by the CPU 61 or necessary information for such execution onto or from the hard disks. A drive 69 may be loaded with a magnetic disk 81, an optical disk 82, a magneto-optical disk 83 or a semiconductor memory 84 when necessary and write or read data into or from the loaded medium.

The network interface 70 is connected to the authentication processing apparatus 41 and sends or receives data to and from the authentication processing apparatus 41.

The components 64 to 70 described are connected to the CPU 61 through the input/output interface 62 and the internal bus 63.

The CPU 61 temporarily stores, for example, a composite waveform inputted from the authentication processing apparatus 41 into the RAM 66 and performs, when necessary, spectrum conversion in a predetermined unit period of time based on the composite waveform temporarily stored in the RAM 66 through a process similar to that of the spectrum conversion section 31 described hereinabove with reference to FIG. 9.

Upon execution of user registration (when the inputted signal is a template to be used as a reference for an authentication process), the CPU 61 controls the HDD 68 to record the composite waveform temporarily stored in the RAM 66 or the spectrum data together with user information such as a user name and a user ID inputted from the inputting section 64. In particular, data similar to, for example, the composite waveform recorded in the template recording section 18 described hereinabove with reference to FIGS. 2 and 9 or a template of the spectrum data are recorded by the HDD 68. Naturally, a plurality of templates may be recorded for one registered user also by the HDD 68.

Then, upon execution of an authentication process (when the inputted signal is detection data with regard to which an authentication process is to be performed), the CPU 61 compares the composite waveform temporarily stored in the RAM 66 (or spectrum data) with the composite waveform signals stored as templates in the HDD 68 (or spectrum data) to discriminate whether or not the inputted impulse response coincides with one of the templates of the registered users.

Then, the CPU 61 outputs a result of the discrimination to the display section 67 through the internal bus 63 and the inputting section 64 so that the result of the discrimination may be displayed on the display section 67.

Thus, in the second embodiment of the present invention, the processes to be executed by the components 17 to 21 in the first embodiment and the process to be executed by the spectrum conversion section 31 when necessary are executed by the personal computer 42.

In particular, in the second embodiment of the present invention, of the processes described hereinabove with reference to the flow chart of FIG. 4, the process to be executed by the memory 17 at step S7 is executed by the RAM 66; the process to be executed by the template recording section 18 at step S9 is executed by the HDD 68; the process to be executed by the comparison discrimination processing section 20 at step S10 is executed by the CPU 61; the process to be executed by the outputting section 21 at step S11 is executed by the display section 67; and the process to be executed by the spectrum conversion section 31 of FIG. 9 is executed by the CPU 61.

It is to be noted that, while, in the second embodiment, the authentication processing apparatus 41 described above has the data synthesis section 16, alternatively a pulse signal generated by the pulse generation section 11 and an amplified impulse outputted from the amplifier 15 may be supplied to the personal computer 42 so that the CPU 61 of the authentication processing apparatus 41 may execute an arithmetic operation process for synthesizing the data.

While, in the processing described above, a pulse signal is applied to the living organism of the user, alternatively a frequency sleeve signal may be applied to the living organism of the user. However, where a frequency sleeve signal is used, it is very difficult to verify a characteristic of a response signal in the direction of time, and besides, sound disagreeable to the user is generated in the identification process. Therefore, it is preferable to use a pulse signal rather than a frequency sleeve signal.

By applying the present invention to execute a personal identification process, since information relating to living organism information which cannot be imitated readily is used, a reliable authentication process can be achieved when compared with an alternative case wherein a password which may possibly leak or fingerprint information which may possibly be imitated is utilized for a personal authentication process, and besides, there is no necessity for the user to perform a complicated process.

Further, even if a registered template leaks, if a user registration process is executed newly, that is, if an impulse response to a pulse signal different from a pulse signal having been used for measurement of the leaking template is measured to record a new template and a later authentication process is performed using the new pulse signal, then impersonation of a third party wherein the data of the leaking template is used can be prevented without significantly modifying the authentication processing apparatus or a system relating to it.

Also it is possible to periodically measure an impulse response to a different pulse signal with regard to all registered users to perform a user registration process and periodically update the templates thereby to further strengthen the security.

Further, the personal identification process described above can be applied to perform personal authentication of users of various apparatus. Several examples are described below.

Figure 14:
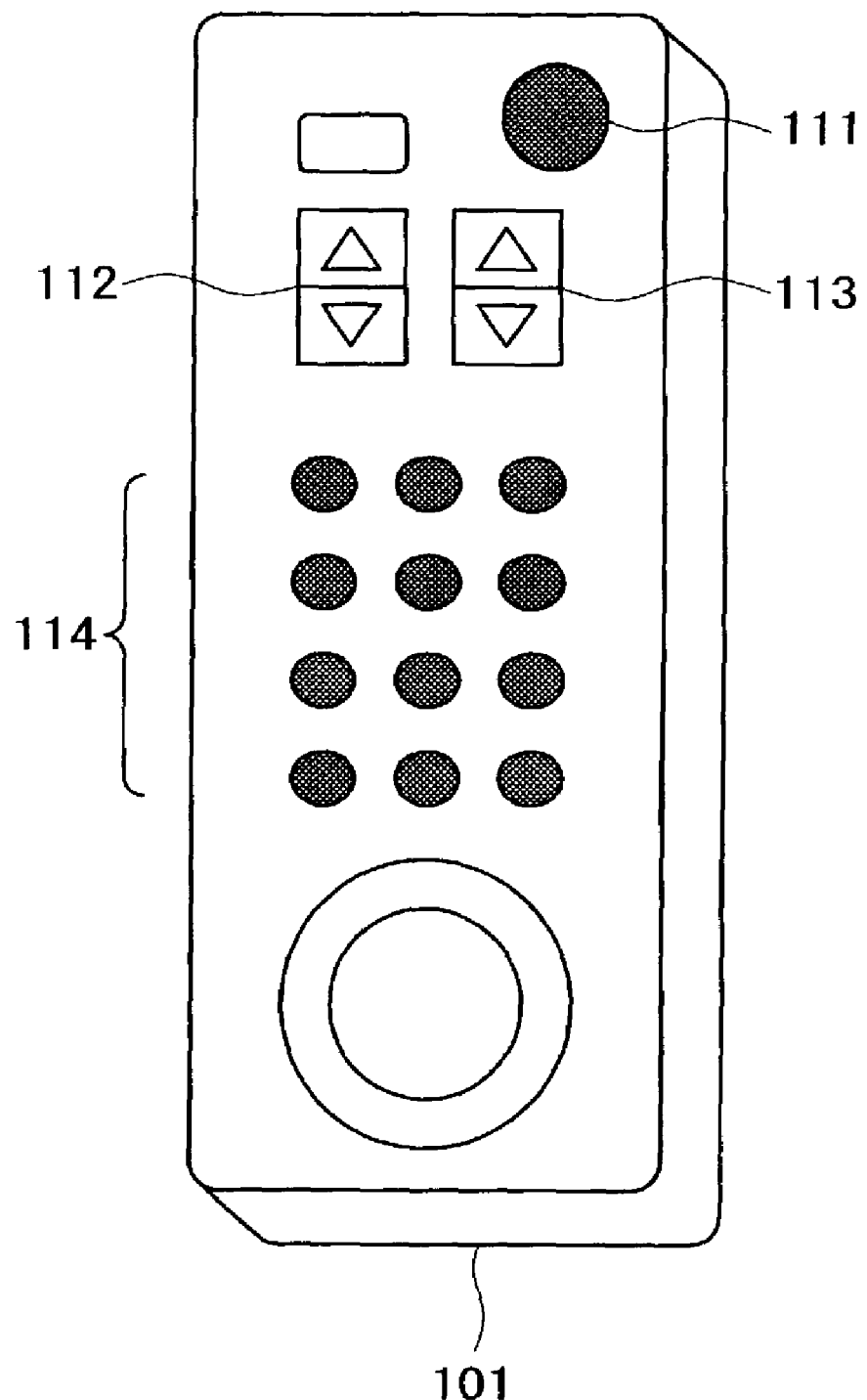
FIG. 14 is a diagram showing an appearance of a remote commander to which the present invention is applied.

FIG. 14 shows an appearance of a remote commander 101 to which the present invention is applied. Referring to FIG. 14, the remote commander 101 receives an operation input of the user and transmits a signal in the form of infrared rays representative of the operation of the user to an object apparatus such as, for example, a television receiver, a cassette tape deck, a tuner or an air conditioner. Here, it is assumed that the remote commander 101 transmits a signal in the form of infrared rays representative of an operation of the user to a television receiver.

The remote commander 101 includes a power supply button 111, a volume up/down button 112, a channel up/down button 113, and a button set 114.

The power supply button 111 is depressed in order to switch on/off the power supply to the television receiver. The volume up/down button 112 is depressed in order to adjust the volume of sound to be outputted. The channel up/down button 113 is depressed in order to select a channel to be viewed. The button set 114 is selectively depressed in order to select a channel to be viewed directly with a channel number or perform some other operation inputting.

A speaker-microphone having functions of both of the speaker 13 and the microphone 14 described hereinabove is provided on the surface (portion with which the user is to touch at a finger thereof) of the power supply button 111 of the remote commander 101 or the power supply button 111, volume up/down button 112, channel up/down button 113 and button set 114.

Figure 15:
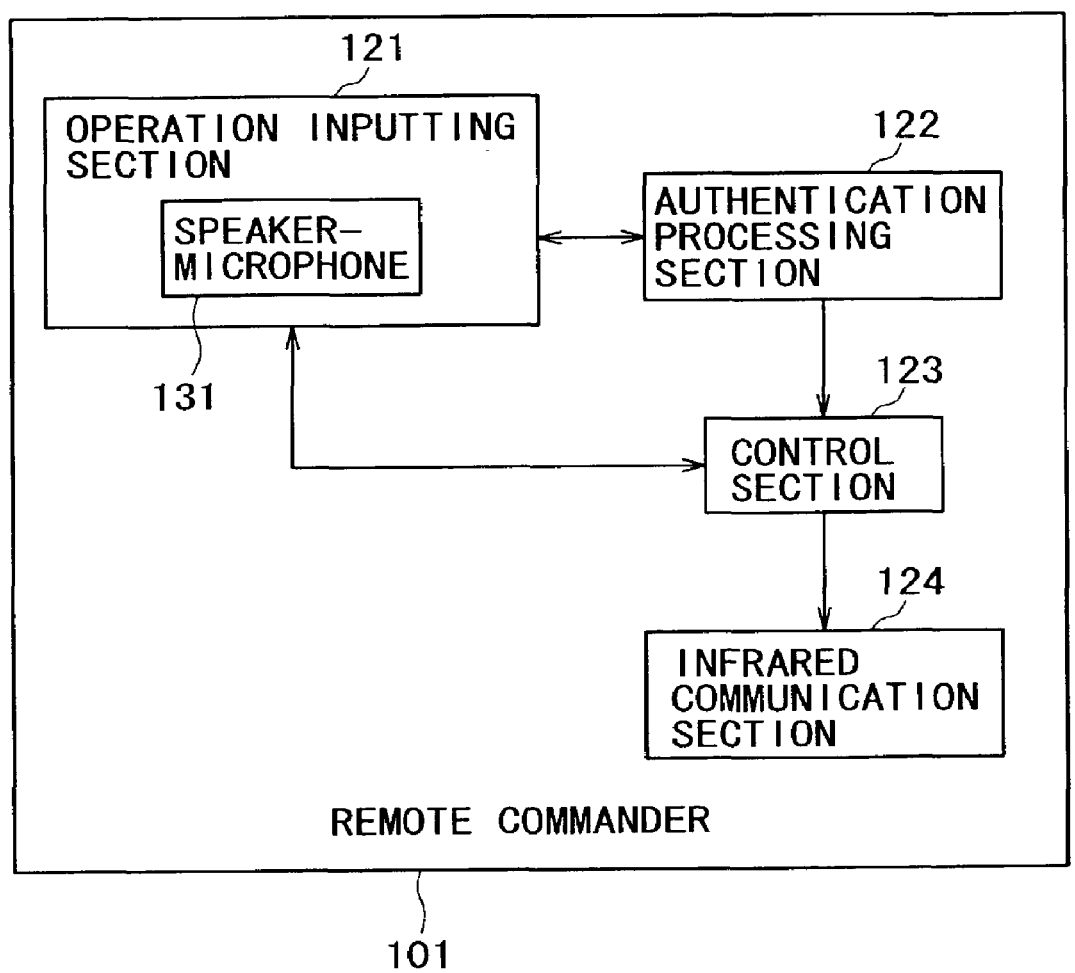
FIG. 15 is a block diagram showing a configuration of the remote commander of FIG. 14.

FIG. 15 shows an internal configuration of the remote commander 101.

Refer to FIG. 15, an operation inputting section 121 supplies, when any of the power supply button 111, volume up/down button 112, channel up/down button 113 and button set 114 is operated by the user, a signal representative of contents of the operation to a control section 123. Further, a speaker-microphone 131 is provided on the surface of the power supply button 111 of the remote commander 101 or the power supply button 111, volume up/down button 112, channel up/down button 113 and button set 114. The speaker-microphone 131 outputs an amplified pulse signal supplied thereto from an authentication processing section 122 and receives an input of an impulse response obtained when the outputted pulse signal hits a finger or the like of the user and is transmitted through the living organism including the bone, and then outputs the received impulse response to the authentication processing section 122.

The authentication processing section 122 produces a pulse signal to be outputted from the speaker-microphone 131 and supplies the pulse signal to the speaker-microphone 131 of the operation inputting section 121. Further, the authentication processing section 122 discriminates based on an impulse response inputted from the speaker-microphone 131 whether or not the person who is operating the remote commander 101 is a registered user, and outputs a result of the discrimination to the control section 123.

Figure 16:
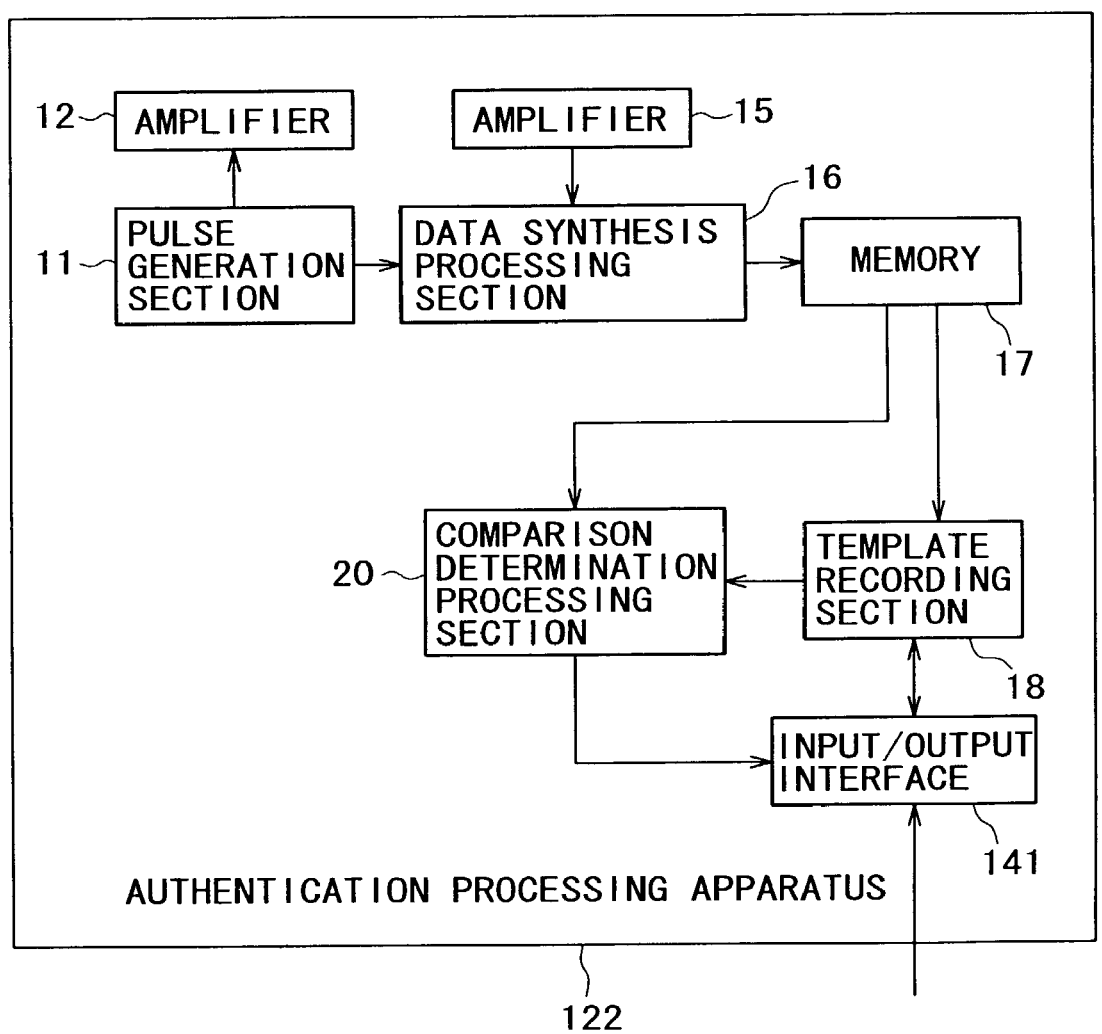
FIG. 16 is a block diagram showing a detailed configuration of an authentication processing section shown in FIG. 15.

FIG. 16 shows a detailed configuration of the authentication processing section 122. It should be noted that the same component elements as those in FIG. 2 are denoted by the same symbols and the description will be omitted suitably. Referring to FIG. 16, the authentication processing section 122 has a configuration basically similar to that of the authentication processing apparatus 1 described hereinabove with reference to FIG. 2 except that it eliminates the speaker 13, microphone 14 and outputting section 21 and includes an input/output interface 141 for sending and receiving information to and from the control section 123 in place of the template recording section 18.

The input/output interface 141 receives an input of information necessary for registration of a user and outputs the information to the template recording section 18. Further, the input/output interface 141 receives an input of a result of a comparison discrimination from the comparison discrimination processing section 20 and supplies the comparison discrimination result as an identification result to the control section 123. Meanwhile, the template recording section 18 stores a signal to be used as a reference for discrimination in authentication of a user who can select all channels using the remote commander 101.

Figure 17:
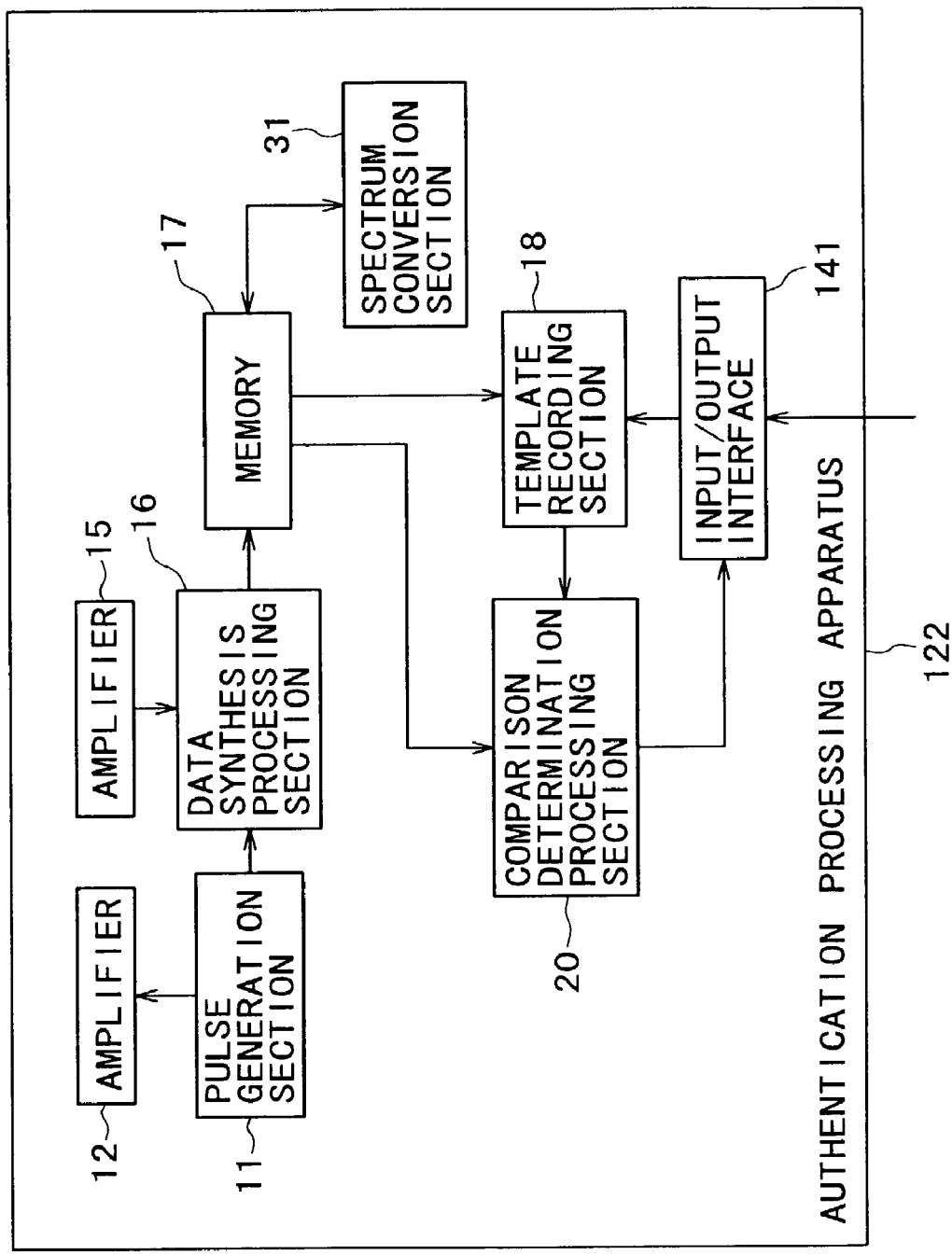
FIG. 17 is a block diagram showing another detailed configuration of the authentication processing section shown in FIG. 15.

FIG. 17 shows a configuration example of the authentication processing section 122 different from that described above with reference to FIG. 16. It should be noted that the same component elements as those in FIG. 9 are denoted by the same symbols and the description will be omitted suitably. Referring to FIG. 17, the authentication processing section 122 has a configuration basically similar to that of the authentication processing apparatus 1 described hereinabove with reference to FIG. 9 except that it eliminates the speaker 13, microphone 14 and outputting section 21 and includes an input/output interface 141 for sending and receiving information to and from the control section 123 in place of the template recording section 18.

The control section 123 basically performs a process of transmitting a signal representative of an operation input of the user supplied from the operation inputting section 121 to the television receiver through an infrared communication section 124. However, when a discrimination result that the person who is operating the remote commander 101 is not a registered user is inputted, the control section 123 further performs such utilization restriction as, for example, to invalidate an operation of a predetermined button of the operation inputting section 121, to disable selection of a predetermined channel irrespective of an operation inputted to the operation inputting section 121 or to invalidate all operation inputs.

If the speaker-microphone 131 is provided only on the power supply button 111, then the configuration of the apparatus can be simplified. However, there is the possibility that another user who is not registered may possibly use the remote commander 101 to perform an inputting operation when the registered user does not disconnect the power supply in error. On the other hand, if the speaker-microphone 131 is provided on all of the power supply button 111, volume up/down button 112, channel up/down button 113 and button set 114, then although the configuration of the apparatus is complicated when compared with the former case wherein the speaker-microphone 131 is provided only on the power supply button 111, any operation input by any user who is not registered can be detected to restrict use of the remote commander 101 by the non-registered user.

Figure 18:
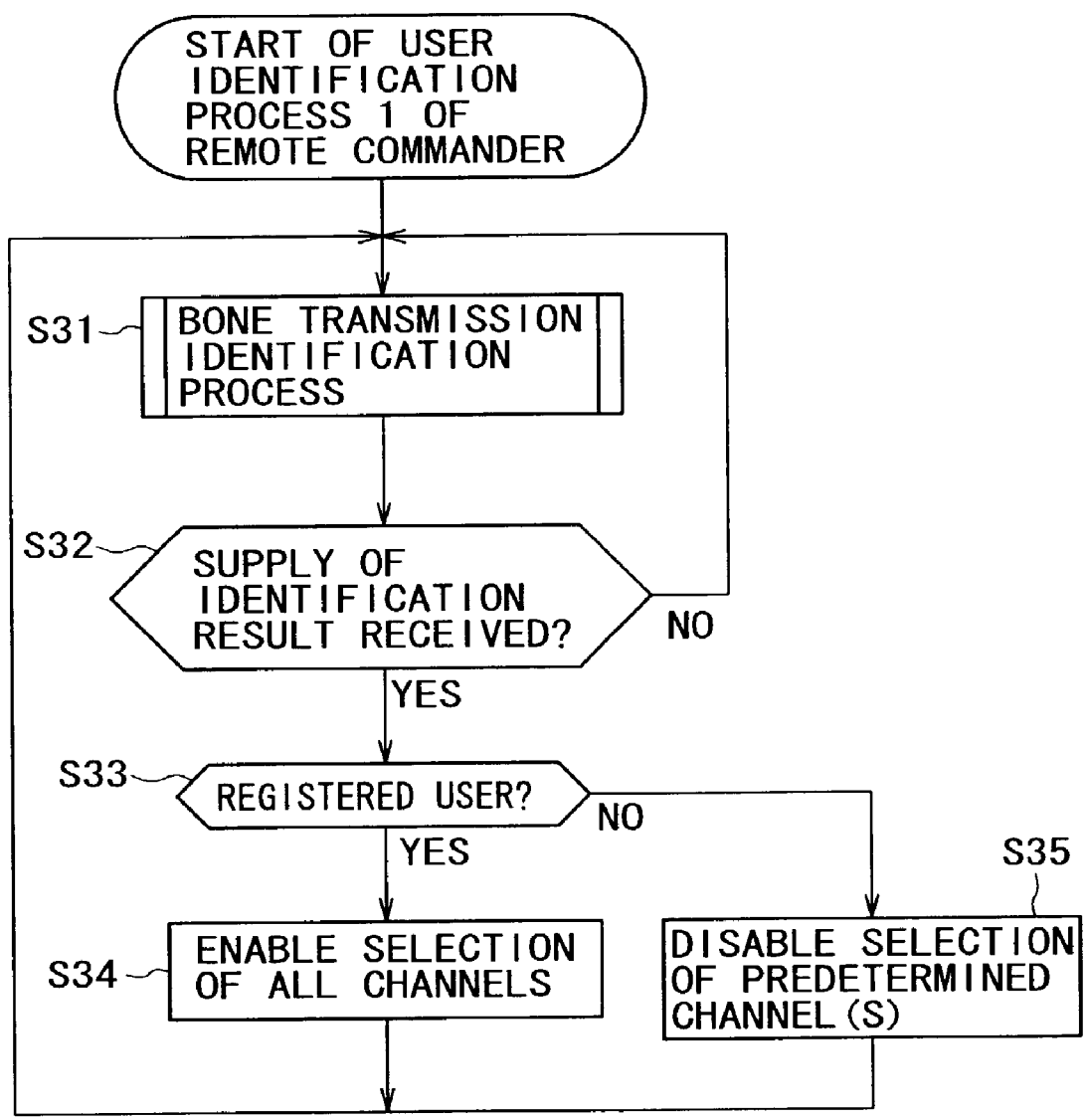
FIG. 18 is a flow chart illustrating a user identification process of the remote commander of FIG. 14.

A user identification process 1 executed by the remote commander 101 is described with reference to a flow chart of FIG. 18. It is assumed here that the user uses the remote commander 101 to control the television receiver.

Figure 4:
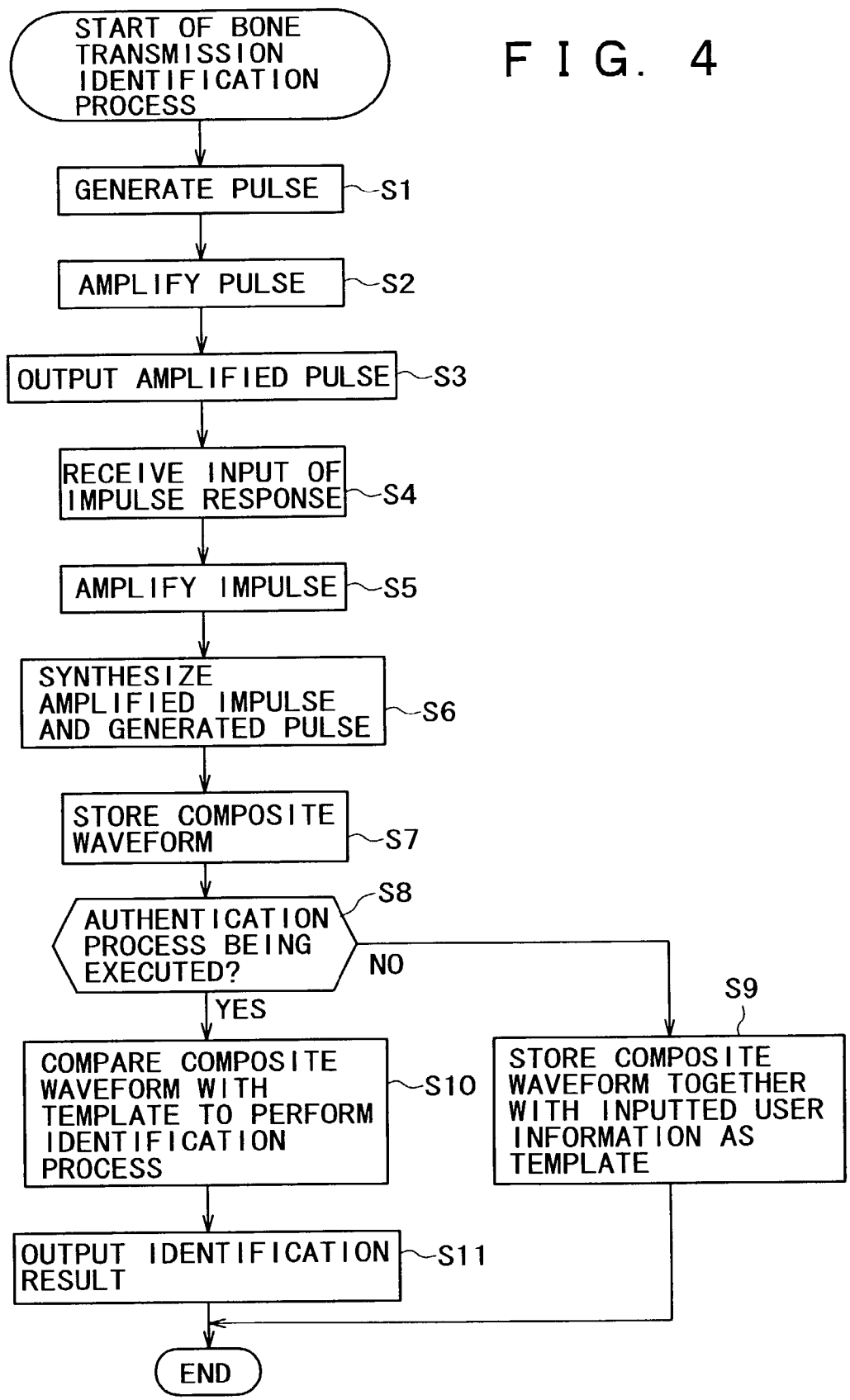
FIG. 4 is a flow chart illustrating a process executed by the authentication processing apparatus of FIG. 1.

At step S31, the bone transmission identification process described hereinabove with reference to the flow chart of FIG. 4 is executed. It is to be noted, however, that, at step S31 here, the process executed by the speaker 13 or the microphone 14 in the processing described hereinabove with reference to the flow chart of FIG. 4 is executed by the speaker-microphone 131. Further, the comparison discrimination processing section 20 outputs a result of the discrimination not to the outputting section 21 but to the input/output interface 141, and not the outputting section 21 but the input/output interface 141 outputs the received identification result to the control section 123.

At step S32, the control section 123 discriminates whether or not a supply of an identification result is received from the authentication processing section 122. If it is discriminated at step S32 that a supply of an identification result is not received from the authentication processing section 122, then the processing returns to step S31 so that the processing at step S31 et seq. is repeated.

If it is discriminated at step S32 that a supply of an identification result is received from the authentication processing section 122, then the control section 123 determines, at step S33, based on the identification result supplied thereto from the authentication processing section 122, whether or not the person who has performed the operation input is a registered user.

If it is discriminated at step S33 that the person who has performed the operation input is a registered user, then the control section 123 determines, at step S34, that all channels are in a selectable state, and transmits a control signal to the television receiver through the infrared communication section 124 based on a signal representative of the operation input of the user supplied from the operation inputting section 121. Thereafter, the processing returns to step S31 so that the processing at step S31 et al. is repeated.

If it is discriminated at step S33 that the person who has performed the operation input is not a registered user, then the control section 123 determines that a predetermined channel is in a selection disabling state and thus disables an operation of, for example, a predetermined button of the button set 114 or inhibits, even if a channel is selected using the channel up/down button 113, transmission of a control signal for selecting the predetermined channel to the television receiver through the infrared communication section 124. Thereafter, the processing returns to step S31 so that the processing at step S31 et al. is repeated.

Since any user other than the registered user is restrained from selecting the predetermined channel using the remote commander 101 through the process described above with reference to the flow chart of FIG. 18, for example, if only adults in a home are registered as registered users in a remote commander for a television receiver which is used by a plurality of users in the home, then it is possible to restrain a child from selecting a channel whose enjoyment by a child is not preferable while any other operation input by the child is acceptable.

It is to be noted that, while, in the foregoing description, a user who is not registered is restrained from selecting a particular channel, the remote commander 101 may be set such that it does not accept any operation input by a user who is not registered.

Further, where data to be registered in advance include information of the age or the like, the remote commander 101 may be set such that it uses such utilization restriction that it ignores any operation input by a user who is not registered and besides invalidates, if it is discriminated that the person who operates the remote commander 101 is a minor although the person is a registered user, an operation only of a particular button so that selection only of the particular channel is disabled.

Further, where a television receiver or the like can accept registration of a personally customized program list in advance or registration of a recording reserved program list, personal identification in which the remote commander 101 is used may be applied so that a program list for each of registered users is displayed or a recording reserved program list is automatically selected and displayed or is restricted from being referred to by another user.

In the process described above with reference to FIG. 18, the remote commander 101 is used to perform an operation input to a television receiver. Naturally, however, the remote commander 101 may remotely control any other apparatus. For example, the present invention may be applied to a remote commander for remotely controlling an air conditioner so that a child cannot perform an operation input thereby to prevent mischief or any other user than the registered user cannot adjust the temperature to a temperature outside a predetermined temperature range thereby to prevent the preset temperature of the air conditioner from being set to an abnormally low or high temperature by an erroneous operation of the remote commander 101 by an old person.

The present invention can be applied not only to the remote commander 101 but also to any apparatus remotely controlled by the remote commander 101, a recording medium used in the apparatus and so forth. Particularly where an apparatus which is remotely controlled by the remote commander 101 includes a button or a key which can be operated to input other than those of the remote commander 101, the present invention is preferably applied also to the apparatus side.

Figure 19:
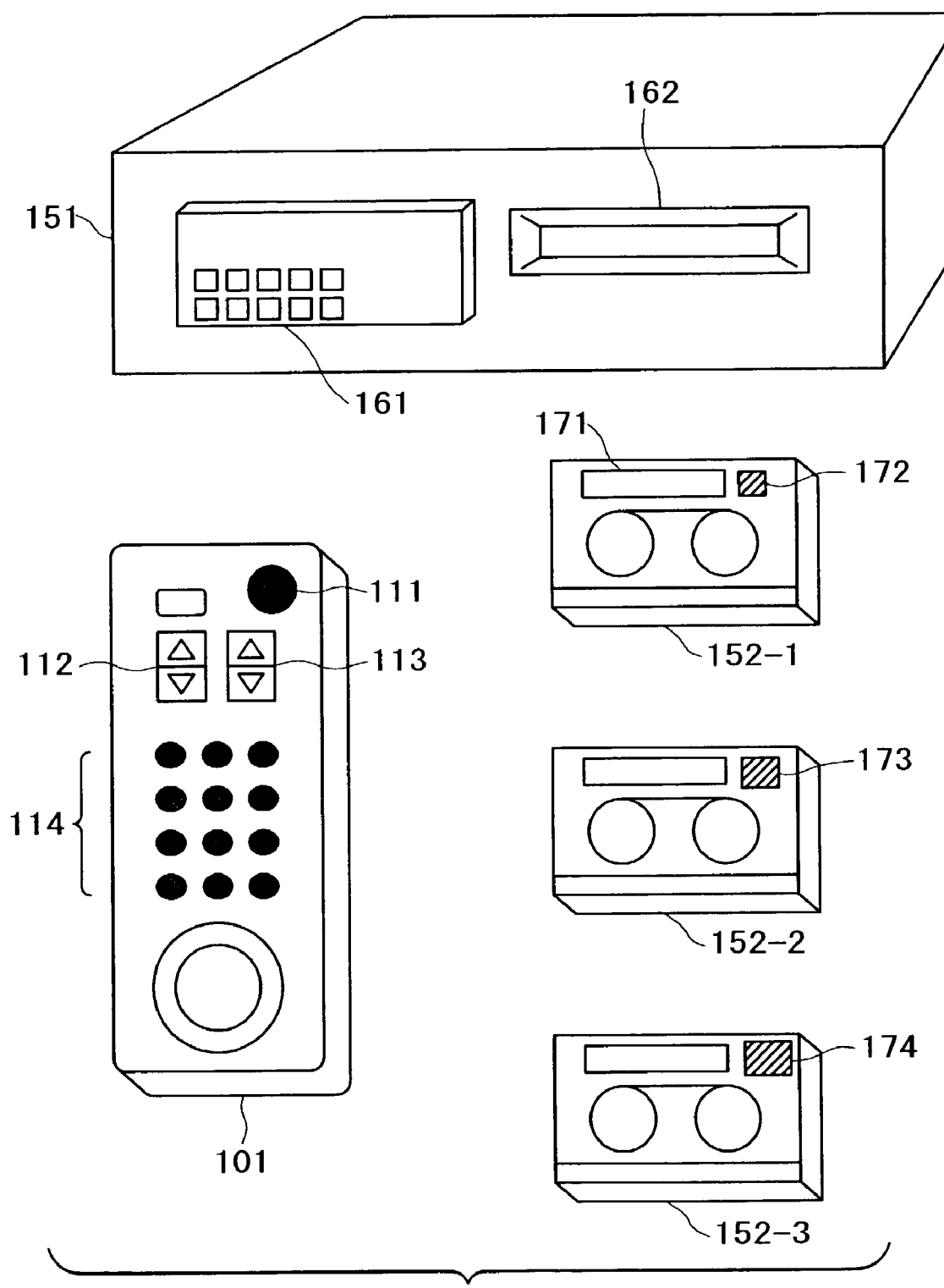
FIG. 19 is a schematic view showing a recording and reproduction system of video data to which the present invention is applied.

FIG. 19 shows a recording and reproduction system for video data to which the present invention is applied.

Referring to FIG. 19, a cassette tape deck 151 is connected, for example, to a television receiver, a tuner or the like such that, in response to an operation inputted by the user using the remote commander 101 or an operation panel 161, it reproduces data recorded in a video cassette tape (one of video cassette tapes 152-1 to 152-3 to which the present invention is applied or a conventional video cassette tape not shown) loaded in a video cassette loading opening 162 and outputs the reproduced data to the television receiver so as to be displayed on the television receiver, or records data supplied from the television receiver or the tuner onto a video cassette tape (one of the video cassette tapes 152-1 to 152-3 to which the present invention is applied or a conventional video cassette tape not shown) loaded in the video cassette loading opening 162. A speaker-microphone 131 is provided at a location of the CPU 61 with which the user touches to perform an operation.

Although the cassette tape deck 151 can record or reproduce data onto or from a conventional video cassette tape in a conventional manner, if the video cassette tape 152-1 which includes an authentication processing section 201 hereinafter described with reference to FIG. 21 or an authentication processing section 221 hereinafter described with reference to FIG. 22, the video cassette tape 152-2 which includes an authentication processing section 231 hereinafter described with reference to FIG. 23 or the video cassette tape 152-3 which includes a tag 174 on which a user ID of a user who can use the video cassette tape 152-3 is recorded is loaded in the cassette tape deck 151, then the cassette tape deck 151 executes a user identification process.

The video cassette tape 152-1 which includes the authentication processing section 201 hereinafter described with reference to FIG. 21 or the authentication processing section 221 hereinafter described with reference to FIG. 22 includes a speaker-microphone 131 provided over the overall surface thereof such that, at whichever portion the user touches with the surface of the video cassette tape 152-1, the user touches with the speaker-microphone 131. The video cassette tape 152-1 includes a display section 171 and a connection terminal 172. The video cassette tape 152-2 which includes the authentication processing section 231 hereinafter described with reference to FIG. 23 has a speaker-microphone 131 provided over the overall surface thereof, and has a connection terminal 173 provided thereon. The video cassette tape 152-3 has a tag 174 provided thereon on which a user ID of a user who can use the video cassette tape 152-3 is recorded.

Figure 23:
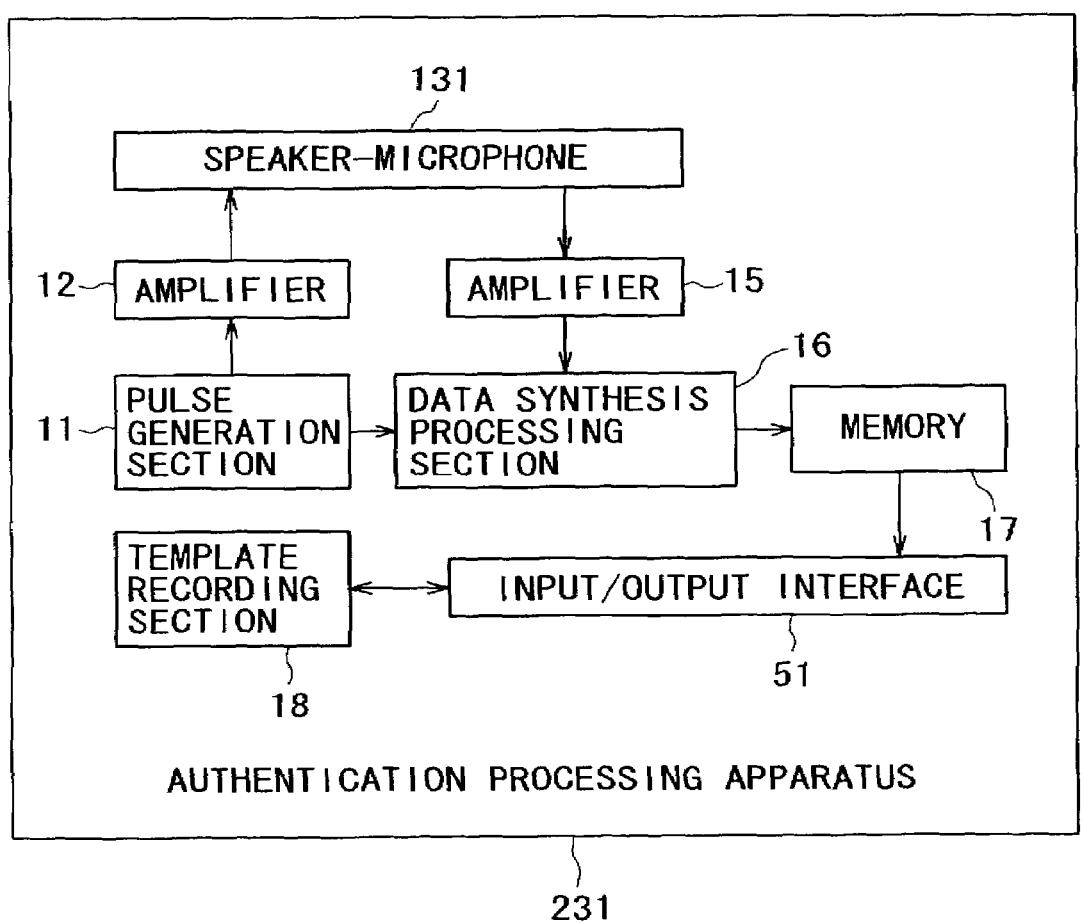
FIG. 23 is a block diagram showing a further configuration of the authentication processing section provided in the video cassette tape shown in FIG. 19.

In the following description, the video cassette tape 152-1 which includes the authentication processing section 201 hereinafter described with reference to FIG. 21 or the authentication processing section 221 hereinafter described with reference to FIG. 22 is referred to as video cassette tape of the type A; the video cassette tape 152-2 which includes the authentication processing section 231 hereinafter described with reference to FIG. 23 is referred to as video cassette tape of the type B; and the video cassette tape 152-3 which has the tag 174 provided thereon on which a user ID of a user who can use the video cassette tape 152-3 is recorded is referred to as video cassette tape of the type C.

Figure 20:
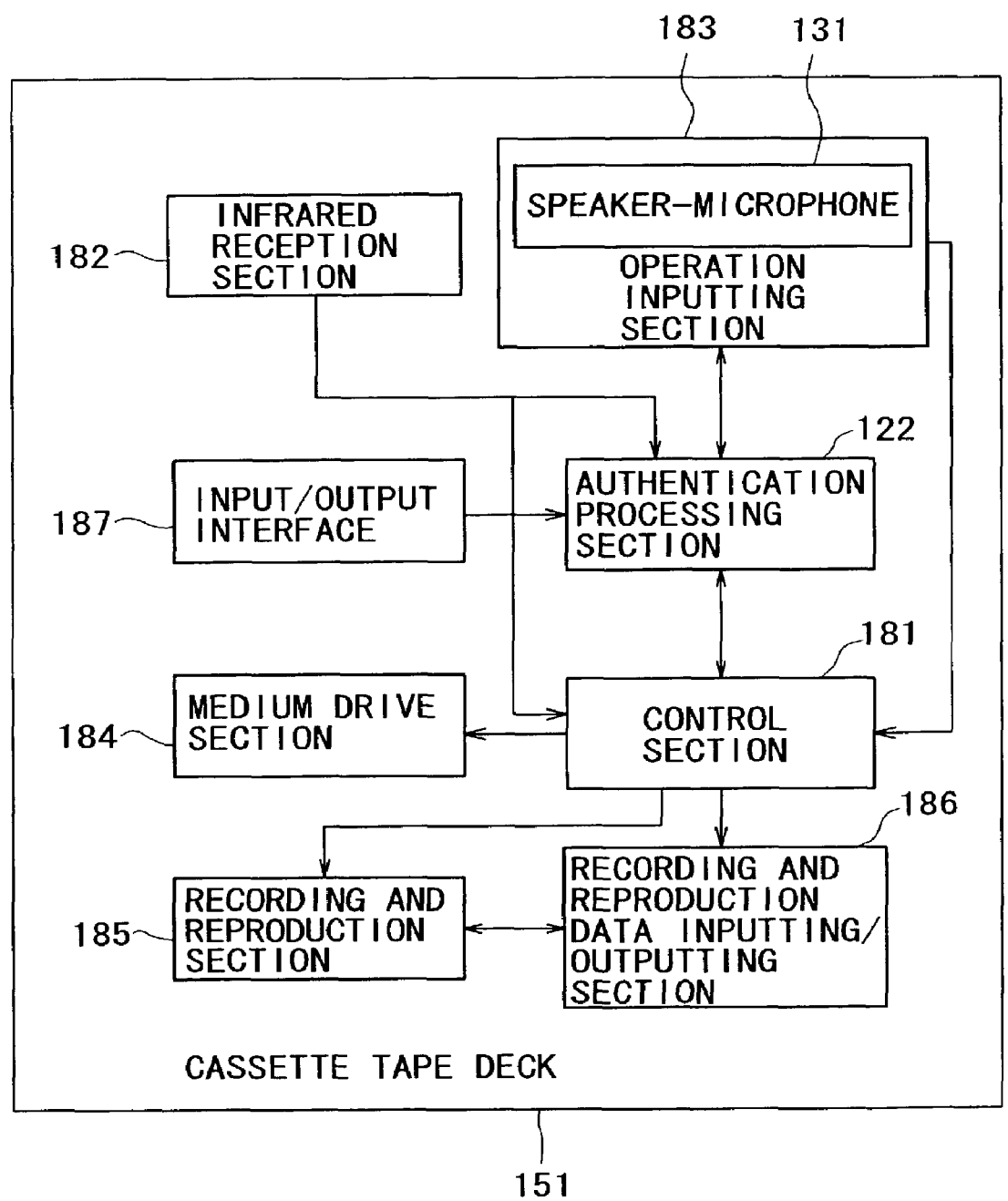
FIG. 20 is a block diagram showing a configuration of a cassette deck shown in FIG. 19.

FIG. 20 shows an internal configuration of the cassette tape deck 151.

Referring to FIG. 20, a control section 181 controls operation of the cassette tape deck 151. For example, if a video cassette tape is loaded into the cassette tape deck 151, then the control section 181 discriminates based on a signal supplied thereto from an input/output interface 187 whether the video cassette tape loaded is one of the video cassette tapes 152-1 to 152-3 described above with reference to FIG. 19 or a conventional video cassette tape which does not have a personal identification function. When necessary, the control section 181 acquires an identification result, composite waveform data or a user ID recorded on the tag 174 from the input/output interface 187. The control section 181 controls a medium drive section 184 based on an identification result supplied thereto from the authentication processing section 122 to unload the video cassette tape loaded or controls a recording and reproduction section 185 and a recorded and reproduction data inputting/outputting section 186 to record or reproduce data onto or from the video cassette tape loaded.

The authentication processing section 122 has basically the same configuration as that of the authentication processing section 122 described hereinabove with reference to FIG. 16 or 17. The authentication processing section 122 receives a supply of an identification result, composite waveform data or a user ID and so forth recorded on the tag 174 through the input/output interface 187, receives an input of an impulse response from the speaker-microphone 131 of an operation inputting section 183 or an input of an identification result from the remote commander 101 through an infrared reception section 182, discriminates whether or not a process of recording or reproducing data onto or from the video cassette tape loaded may be performed, and supplies a result of the discrimination to the control section 181.

Where the template recording section 18 of the authentication processing section 122 is so configured such that it executes an authentication process only when the video cassette tape 152-1 or the video cassette tape 152-2 is loaded, it determines that a signal which is used as a reference for discrimination in authentication of a user is not recorded in advance, but where the template recording section 18 is configured such that it executes an authentication process when the video cassette tape 152-3 is loaded, it determines that a signal which is used as a reference for discrimination in authentication of a user is recorded in advance.

The infrared reception section 182 receives an identification result and a signal representative of an operation input of the user transmitted making use of infrared rays from the remote commander 101, and supplies the identification result to the authentication processing section 122 and supplies the signal representative of an operation input of the user to the control section 181.

The operation inputting section 183 supplies a signal representative of an operation inputted by the user using the operation panel 161 to the control section 181, and receives an input of an amplified pulse signal from the authentication processing section 122 and outputs the amplified pulse signal to a finger or the like of the user from the speaker-microphone 131. Further, the operation inputting section 183 receives an input of an impulse response from the speaker-microphone 131 and outputs the impulse to the authentication processing section 122.

The input/output interface 187 has a connection terminal provided thereon at the position of the connection terminal 172 when the video cassette tape 152-1 is loaded, the position of the connection terminal 173 when the video cassette tape 152-2 is loaded, or the position of the tag 174 when the video cassette tape 152-3 is loaded so that it can acquire an identification result, composite waveform data or a user ID and so forth recorded on the tag 174 or acquire template data recorded in the template recording section 18 of the authentication processing section 201, the authentication processing section 221 or the authentication processing section 231 which is hereinafter described.

The medium drive section 184 transports, under the control of the control section 181, a video cassette tape loaded in the video cassette loading opening 162 to a position at which a recording or reproduction process for the video cassette tape can be performed by the recording and reproduction section 185, or transports a video cassette tape to a position at which the user can take out the video cassette tape from the video cassette loading opening 162.

The recording and reproduction section 185 has a magnetic head for reading in data from or writing data onto a video cassette tape, and outputs data read from a video cassette tape from the recorded and reproduction data inputting/outputting section 186 to the outside so as to be reproduced or records data inputted from the recorded and reproduction data inputting/outputting section 186 onto a video cassette tape.

The recorded and reproduction data inputting/outputting section 186 receives an input of data from, for example, a television receiver or a tuner and supplies the received data to the recording and reproduction section 185 so as to be recorded onto a video cassette tape loaded in the video cassette loading opening 162, or receives an input of data read by the recording and reproduction section 185 and outputs the received data to, for example, a television receiver or a display unit so as to be reproduced.

FIG. 21 shows a configuration of the authentication processing section 201 provided in the video cassette tape 152-1. It should be noted that the same component elements as those in FIG. 2 are denoted by the same symbols and the description will be omitted suitably.

Referring to FIG. 21, the authentication processing section 201 has a configuration basically similar to that of the authentication processing apparatus 1 described hereinabove with reference to FIG. 2 except that it includes a speaker-microphone 131 in place of the speaker 13 and the microphone 14 and includes a display section 171 in place of the outputting section 21, and further includes an input/output interface 141 for sending and receiving information to and from the input/output interface 187 of the cassette tape deck 151 in place of the inputting section 19. The input/output interface 141 is connected to the input/output interface 187 of the cassette tape deck 151 through the connection terminal 172 so that it can send and receive information to and from the input/output interface 187.

The display section 171 is formed from, for example, a liquid crystal panel or an LED device and displays a message for notifying the user of an identification result. The user can confirm the message displayed on the display section 171 to recognize whether or not the user itself can reproduce data recorded on the video cassette tape 152-1 or whether or not the user itself can record data onto the video cassette tape 152-1. The template recording section 18 has a signal recorded therein which is used as a reference for discrimination in authentication of a user who can reproduce data from the video cassette tape 152-1 or record data onto the video cassette tape 152-1.

FIG. 22 shows a configuration of another authentication processing section 221 provided in the video cassette tape 152-1 but different from the authentication processing section 201 described hereinabove with reference to FIG. 21. It should be noted that the same component elements as those in FIG. 9 are denoted by the same symbols and the description will be omitted suitably. Referring to FIG. 22, the authentication processing section 221 has a configuration basically similar to that of the authentication processing apparatus 1 described hereinabove with reference to FIG. 9 except that it includes a speaker-microphone 131 in place of the speaker 13 and the microphone 14 and includes a display section 171 in place of the outputting section 21, and further includes an input/output interface 141 for sending and receiving information to and from the input/output interface 187 of the cassette tape deck 151 in place of the inputting section 19. The input/output interface 141 is connected to the input/output interface 187 of the cassette tape deck 151 through the connection terminal 172 so that it can send and receive information to and from the input/output interface 187.

The display section 171 displays a message for notifying the user of an identification result. The user can confirm the message displayed on the display section 171 to recognize whether or not the user itself can reproduce data recorded on the video cassette tape 152-1 or whether or not the user itself can record data onto the video cassette tape 152-1. The template recording section 18 has a signal recorded therein which is used as a reference for discrimination in authentication of a user who can reproduce data from the video cassette tape 152-1 or record data onto the video cassette tape 152-1.

FIG. 23 shows a configuration of the authentication processing section 231 provided in the video cassette tape 152-2. It should be noted that the same component elements as those in FIG. 12 are denoted by the same symbols and the description will be omitted suitably.

Referring to FIG. 23, the authentication processing section 231 shown has a configuration basically similar to that of the authentication processing apparatus 41 described hereinabove with reference to FIG. 12 except that it includes a speaker-microphone 131 in place of the speaker 13 and the microphone 14 and additionally includes a memory 17 and a template recording section 18.

The video cassette tape 152-2 acquires a composite waveform of a generated pulse signal and an impulse response necessary for an identification process and supplies it to the cassette tape deck 151. The input/output interface 141 is connected to the input/output interface 187 of the cassette tape deck 151 through the connection terminal 173 so that it can send and receive information to the input/output interface 187. Further, the template recording section 18 has a signal recorded thereon which is used as a reference for discrimination in authentication of a user who can reproduce data from the video cassette tape 152-2 or record data onto the video cassette tape 152-2.

It is to be noted here that, while it is described above that the input/output interface 187 of the cassette tape deck 151 sends or receives information through electric contact to or from the authentication processing section 201 or the authentication processing section 221 of the video cassette tape 152-1, the authentication processing section 231 of the video cassette tape 152-2 or the tag 174 of the video cassette tape 152-3, naturally the transmission or reception of information may be performed otherwise, for example, through contactless communication which makes use of electromagnetic induction or through wireless communication by some other method.

The video cassette tape 152-1 or the video cassette tape 152-2 is loaded into the video cassette loading opening 162 of the cassette tape deck 151 by a hand of the user. Upon such loading, the video cassette tape 152-1 or the video cassette tape 152-2 executes a user recognition process of the user who touches with the speaker-microphone 131 provided on the surface thereof.

The video cassette tape 152-1 executes a process similar to the bone transmission identification process described hereinabove with reference to the flow chart of FIG. 4. However, the processes executed by the speaker 13 and the microphone 14 and described hereinabove with reference to FIG. 4 are executed by the speaker-microphone 131. Further, the comparison discrimination processing section 20 outputs, in place of the outputting section 21, an identification result to the input/output interface 141 and the display section 171, and at step S11, the display section 171 displays the received identification result to notify the user in place of the outputting section 21. The user can confirm such a message as, for example, "The data can be reproduced only by a registered user" displayed on the display section 171 and recognize such a fact that the user itself cannot enjoy data of the video cassette tape 152-1.

Now, a user identification process executed by the authentication processing section 231 of the video cassette tape 152-2 is described with reference to FIG. 24.

At steps S51 to S57, processes similar to those at steps S1 to S7 of the bone transmission identification process described hereinabove with reference to FIG. 4 are executed, and the processing is ended therewith. However, the processes executed by the speaker 13 and the microphone 14 in the description with reference to FIG. 4 are executed by the speaker-microphone 131. In particular, in the authentication processing section 231, an amplified pulse signal is outputted from the speaker-microphone 131 and an impulse response signal from a finger or the like of the user is acquired, and then a composite waveform of the amplified impulse and the generated pulse signal is stored into the memory 17.

Figure 25:
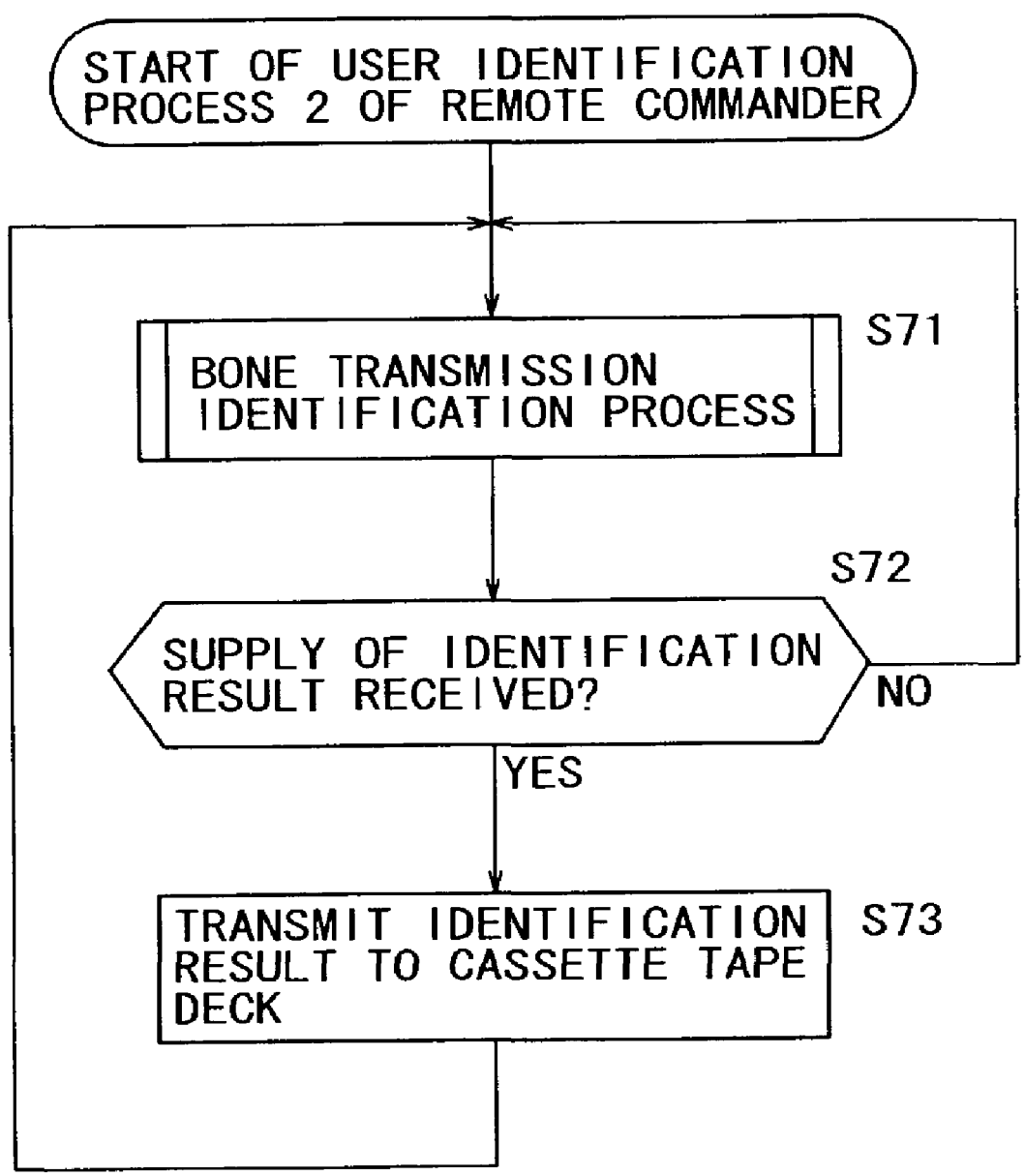
FIG. 25 is a flow chart illustrating another user identification process of the remote commander of FIG. 14.

Subsequently, a user identification process 2 executed by the remote commander 101 is described with reference to a flow chart of FIG. 25.

At step S71, the bone transmission identification process described hereinabove in connection with the flow chart of FIG. 4 is executed. At step S71, however, the processes executed by the speaker 13 and the microphone 14 in the description with reference to FIG. 4 are executed by the speaker-microphone 131. Further, the comparison discrimination processing section 20 outputs an identification result to the input/output interface 141 in place of the outputting section 21, and the input/output interface 141 outputs the inputted identification result to the control section 123 in place of the outputting section 21.

At step S72, the control section 123 discriminates whether or not it receives a supply of an identification result from the authentication processing section 122. If it is discriminated at step S72 that it does not receive a supply of an identification result from the authentication processing section 122, then the processing returns to step S71 so that the processing at step S71 et seq. is repeated.

If it is discriminated at step S72 that a supply of an identification result is received from the authentication processing section 122, then the control section 123 transmits the identification result to the cassette tape deck 151 through the infrared communication section 124, whereafter the processing returns to step S71 so that the processing at step S71 et seq. is repeated.

Figure 26:
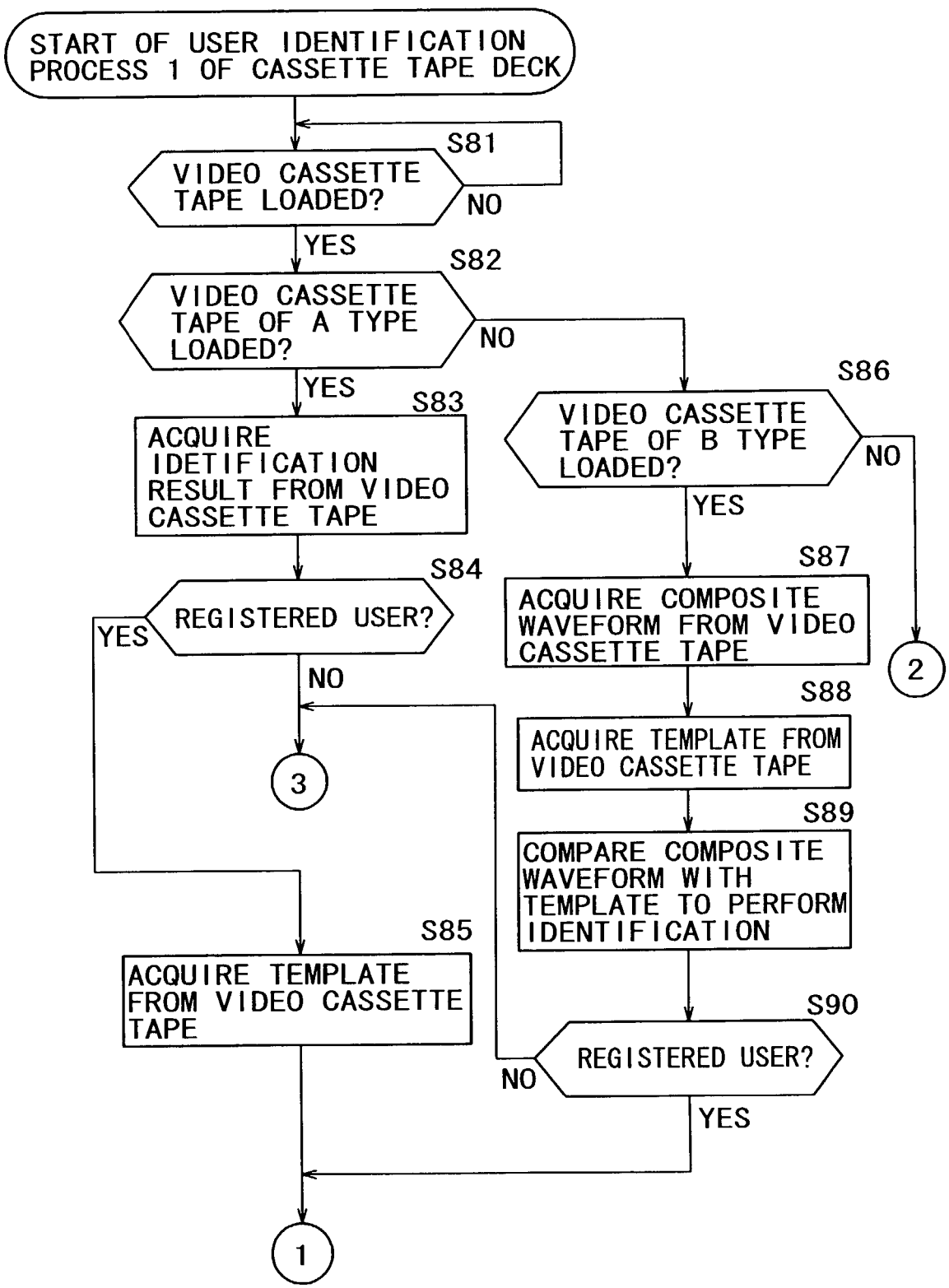
FIGS. 26 and 27 are flow charts illustrating a user identification process of the cassette tape deck shown in FIG. 19.

Now, a user identification process 1 of the cassette tape deck 151 which executes a user identification process when a video cassette tape of the type A or the type B is loaded into it is described with reference to FIGS. 26 and 27.

At step S81, the control section 181 discriminates whether or not a video cassette tape is loaded in the video cassette loading opening 162. If it is discriminated that no video cassette tape is loaded in the video cassette loading opening 162, then the process at step S81 is repeated until after it is discriminated that a video cassette tape is loaded in the video cassette loading opening 162.

If it is discriminated at step S81 that a video cassette tape is loaded in the video cassette loading opening 162, then the control section 181 discriminates at step S82 whether or not the video cassette tape loaded is of the A type, that is, the video cassette tape 152-1 described hereinabove with reference to FIG. 19.

If it is discriminated at step S82 that the video cassette tape loaded is of the A type, then the authentication processing section 122 acquires an identification result from the video cassette tape 152-1 through the input/output interface 187 at step S83.

At step S84, the authentication processing section 122 discriminates based on the identification result acquired from the video cassette tape 152-1 whether or not the user who has loaded the video cassette tape 152-1 is a registered user of the same. If it is discriminated at step S84 that the user is not a registered user, then the processing advances to step S96 which is hereinafter described.

On the other hand, if it is discriminated at step S84 that the user is a registered user, then the authentication processing section 122 acquires a template registered in the authentication processing section 201 of the video cassette tape 152-1 or the template recording section 18 of the authentication processing section 221 through the input/output interface 187 at step S85.

On the other hand, if it is discriminated at step S82 that the video tape cassette loaded is not of the A type, then the control section 181 discriminates at step S86 whether or not the video tape cassette loaded is of the B type, that is, the video cassette tape 152-2 described hereinabove with reference to FIG. 19. If it is discriminated at step S86 that the video cassette tape loaded is not of the B type, then since the video cassette tape loaded is a conventional video cassette tape which does not have the user identification function, the processing advances to step S95 which is hereinafter described.

Figure 24:
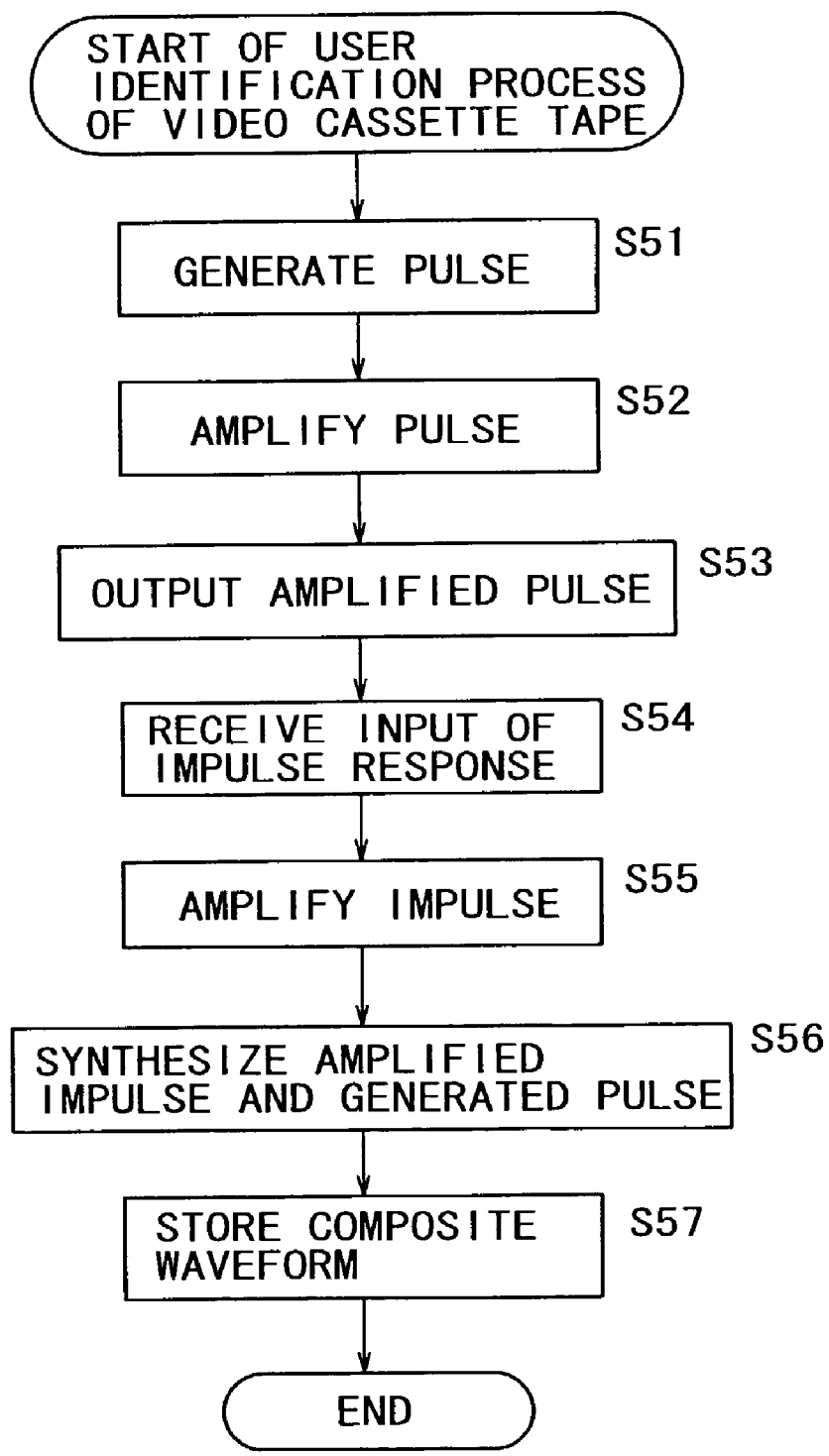
FIG. 24 is a flow chart illustrating a user identification process of the video cassette tape shown in FIG. 19.

If it is discriminated at step S86 that the video cassette tape loaded is of the B type, then the authentication processing section 122 acquires, at step S87, the composite waveform stored at step S57 of FIG. 24 from the video cassette tape 152-2 through the input/output interface 187.

At step S88, the authentication processing section 122 acquires templates registered in the template recording section 18 of the authentication processing section 231 of the video cassette tape 152-2 through the input/output interface 187.

At step S89, the authentication processing section 122 compares the acquired composite waveform and the templates with each other to perform an identification process similarly as in the process at step S10 of FIG. 4.

At step S90, the authentication processing section 122 discriminates based on a result of the identification process executed at step S89 whether or not the user who has loaded the video cassette tape 152-2 is a registered user. If it is discriminated at step S90 that the user who has loaded the video cassette tape 152-2 is not a registered user, then the processing advances to step S96 which is hereinafter described.

After the process at step S85 comes to an end or when it is discriminated at step S90 that the user who has loaded the video cassette tape 152-2 is a registered user, the processing advances to step S91 of FIG. 27 as described hereinabove. Referring now to FIG. 27, at step S91, the authentication processing section 122 discriminates based on a signal supplied thereto from the infrared reception section 182 whether or not an identification result transmitted at step S73 of FIG. 25 is received from the remote commander 101.

If it is discriminated at step S92 that no identification result is received, then the authentication processing section 122 discriminates at step S92 whether or not a supply of an impulse response is received from the speaker-microphone 131 of the operation inputting section 183. If it is discriminated at step S92 that a supply of an impulse response is not received, then the processing returns to step S91 so that the processing at step S91 et seq. is repeated.

If it is discriminated at step S92 that a supply of an impulse response is received, then the bone transmission identification process described hereinabove with reference to the flow chart of FIG. 4 is executed at step S93.

If it is discriminated at step S91 that an identification result is received or after the process at step S93 comes to an end, the authentication processing section 122 discriminates at step S94 whether or not the identification result by the video cassette tape 152-1 or the video cassette tape 152-2 and the identification result received from the remote commander 101 or the identification result by the cassette tape deck 151 at step S93 coincide with each other, that is, whether or not the user who has loaded the video cassette tape 152-1 or the video cassette tape 152-2 and the user who has operated the cassette tape deck 151 are the same person.

On the other hand, if it is discriminated at step S86 that the video cassette tape loaded is not of the B type or if it is discriminated at step S94 that the identification results coincide with each other as described above, then the authentication processing section 122 notifies the control section 181 at step S95 that no authentication process has been performed or the authentication process comes to an end normally. The control section 181 controls the recording and reproduction section 185 to execute a recording or reproduction process onto or from the video cassette tape 152-1 or the video cassette tape 152-2, whereafter the processing is ended.

If it is discriminated at step S84 that the user is not a registered user, or if it is discriminated at step S90 that the user is not a registered user or else if it is discriminated at step S94 that the identification results do not coincide with each other, then the authentication processing section 122 notifies the control section 181 at step S96 that the authentication process has resulted in failure. The control section 181 controls the medium drive section 184 to unload the video cassette tape 152-1 or the video cassette tape 152-2 loaded in the video cassette loading opening 162, whereby the processing is ended.

Through the process described above with reference to the flow charts of FIGS. 26 and 27, it is discriminated whether or not the user who touches with a video cassette tape of the A type or the B type is a registered user who is authorized to perform a recording or reproduction process for the video cassette tape, and it is discriminated whether or not the user who has operated the cassette tape deck 151 is a registered user who is authorized to perform a recording or reproduction process for the loaded video cassette tape, and besides, it is discriminated whether or not the user who has touched with the video cassette tape of the A type or the B type and the user who has operated the cassette tape deck 151 are the same user.

Then, only when a video cassette tape of the A type or the B type is loaded into the cassette tape deck 151 by a registered user and the cassette tape deck 151 is operated by the user same as the user who has loaded the video cassette tape of the A type or the B type, a recording or reproduction process onto or from the video cassette tape is executed, but in any other case, the video cassette tape of the A type or the B type is automatically unloaded from the cassette tape deck 151.

Accordingly, such a situation that data are reproduced from the video cassette tape 152-1 or the video cassette tape 152-2 or data are recorded onto the video cassette tape 152-1 or the video cassette tape 152-2 (according to circumstances, data recorded in advance are erased by data overwritten thereon) by an illegal user can be prevented.

In contrast, if the video cassette tape 152-3 of the type C which does not have the speaker-microphone 131 but has the tag 174 is loaded into the cassette tape deck 151 and a user identification process is executed, then an identification process simplified from that described above is executed.

Now, a user identification process 2 of the cassette tape deck 151 which is executed when a video cassette tape is loaded into the cassette tape deck 151 is described with reference to a flow chart of FIG. 28. It is assumed here that a user ID and so forth of a user who can utilize the video cassette tape 152-3 of the type C and a signal which is used as a reference for identification of the user are recorded in the template recording section 18 of the authentication processing section 122 of the cassette tape deck 151.

At step S111, the authentication processing section 122 acquires a user ID from the tag 174 of the video cassette tape 152-3 loaded in the video cassette loading opening 162 through the input/output interface 187.

Figure 27:
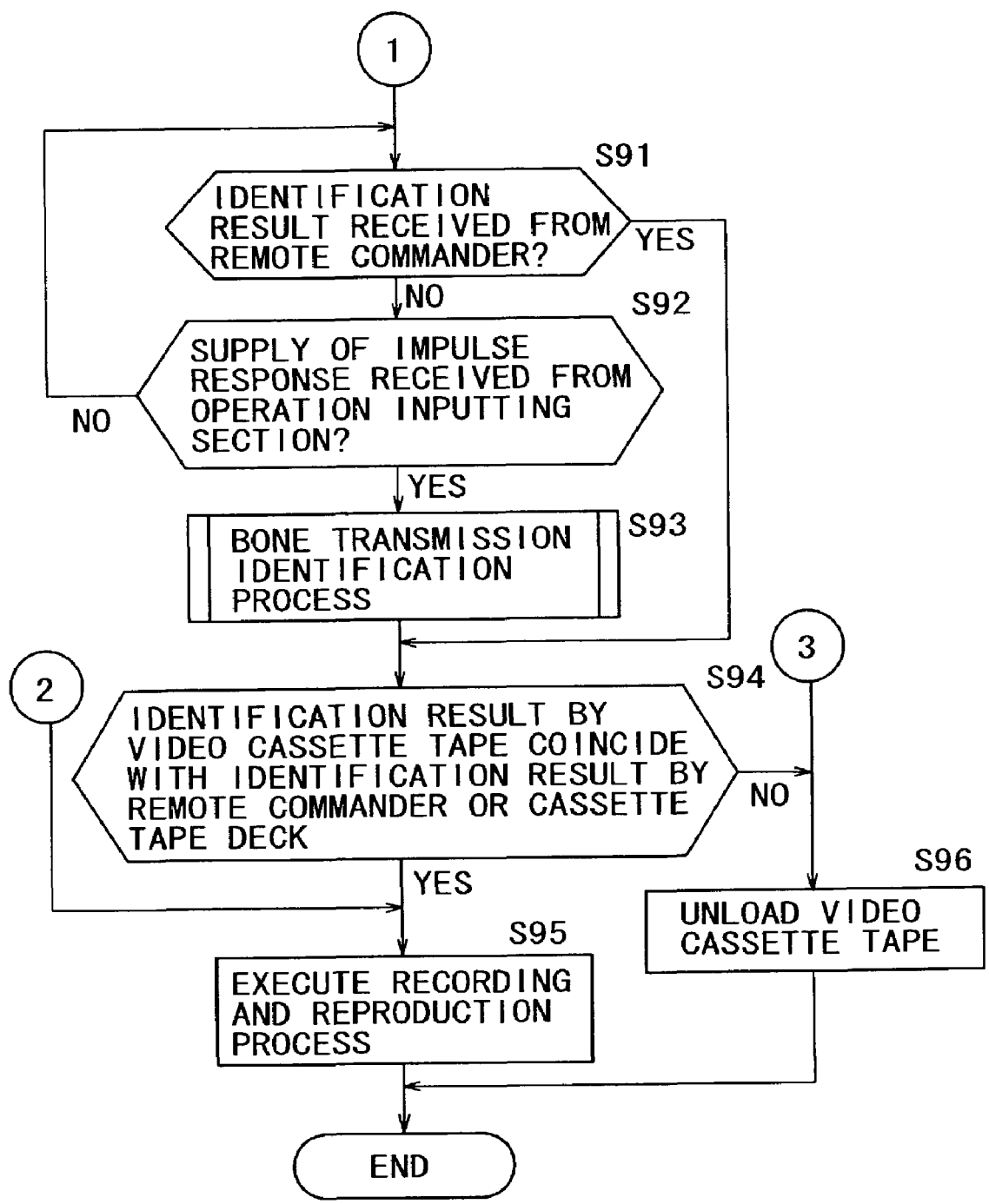

At steps S112 to S114, processes similar to those at steps S91 to S93 described hereinabove with reference to FIG. 27 are executed, respectively. In particular, the processes at step S112 and S113 are repeated until after an identification result is received from the remote commander 101 or a supply of an impulse response is received from the speaker-microphone 131 of the operation inputting section 183. Then, when a supply of an impulse response is received, the bone transmission identification process described hereinabove with reference to FIG. 4 is executed.

At step S115, the authentication processing section 122 discriminates whether or not the identification result received from the remote commander 101 or the identification result by the cassette tape deck 151 at step S114 coincides with the user ID registered in the tag 174 and acquired at step S111.

If it is discriminated at step S115 that the identification result coincides with the user ID registered in the tag 174, then the authentication processing section 122 notifies the control section 181 at step S116 that the authentication process comes to an end normally. The control section 181 controls the recording and reproduction section 185 to execute a recording or reproduction process onto or from the video cassette tape 152-3, whereafter the processing is ended.

If it is discriminated at step S115 that the identification result does not coincide with the user ID registered in the tag 174, then the authentication processing section 122 notifies the control section 181 at step S117 that the authentication process has resulted in failure. The control section 181 controls the medium drive section 184 to unload the video cassette tape 152-3 loaded in the video cassette loading opening 162, whereafter the processing is ended.

Through the process described above with reference to FIG. 28, a simplified user identification process is executed when the video cassette tape 152-3 of the type C which does not have the speaker-microphone 131 but has the tag 174 is loaded into the cassette tape deck 151.

Figure 28:
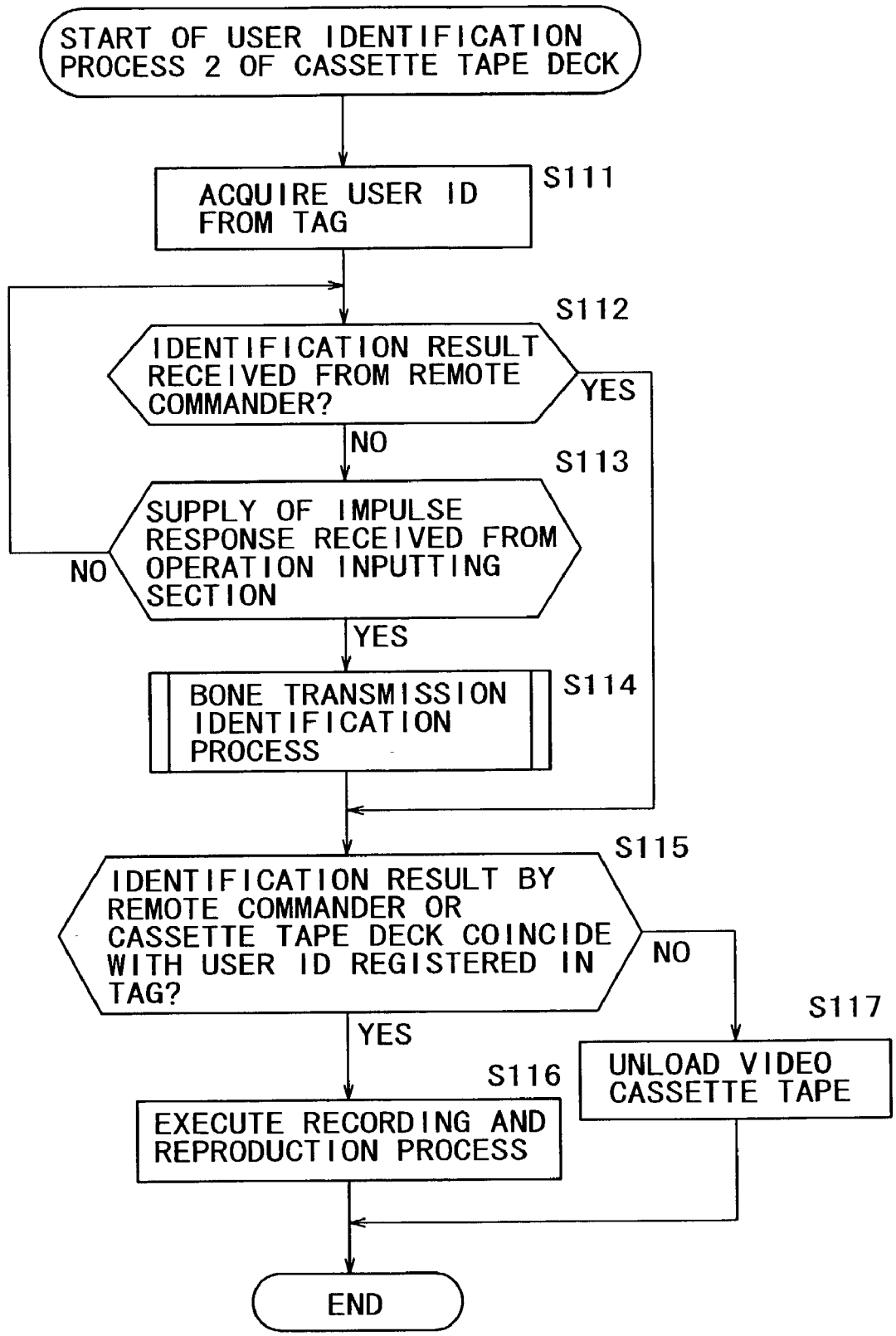
FIG. 28 is a flow chart illustrating another user identification process of the cassette tape deck shown in FIG. 19.

In the description given above with reference to FIG. 28, a signal which is used as a reference for identification of a user who can utilize the video cassette tape 152-3 of the type C is recorded in the template recording section 18 of the authentication processing section 122 of the cassette tape deck 151 together with a user ID and so forth of the user. However, it is otherwise possible to record a signal which is used as a reference for identification of a user who can utilize the video cassette tape 152-3 of the type C together with a user ID and so forth of the user in the tag 174 while the user ID, the reference signal and so forth are not recorded in advance in the template recording section 18 of the authentication processing section 122 of the cassette tape deck 151 whereas the user ID, the reference signal and so forth are read from the tag 174 at step S111.

In FIGS. 19 to 28, a video cassette tape is used to record or reproduce video data. However, the medium into which data are recorded is not limited to a video cassette tape. Also the data to be recorded into a recording medium are not limited to video data.

FIG. 29 shows an appearance of a digital portable telephone set 251 to which the present invention is applied.

Referring to FIG. 29, the digital portable telephone set 251 shown includes a speaker 261 for reproducing and outputting received voice, a microphone 262 for collecting voice of the user or the like, a liquid crystal display section 263 for displaying predetermined data, operation keys 264 for performing an operation input, and an antenna 265 for transmitting and receiving data.

Figure 30:
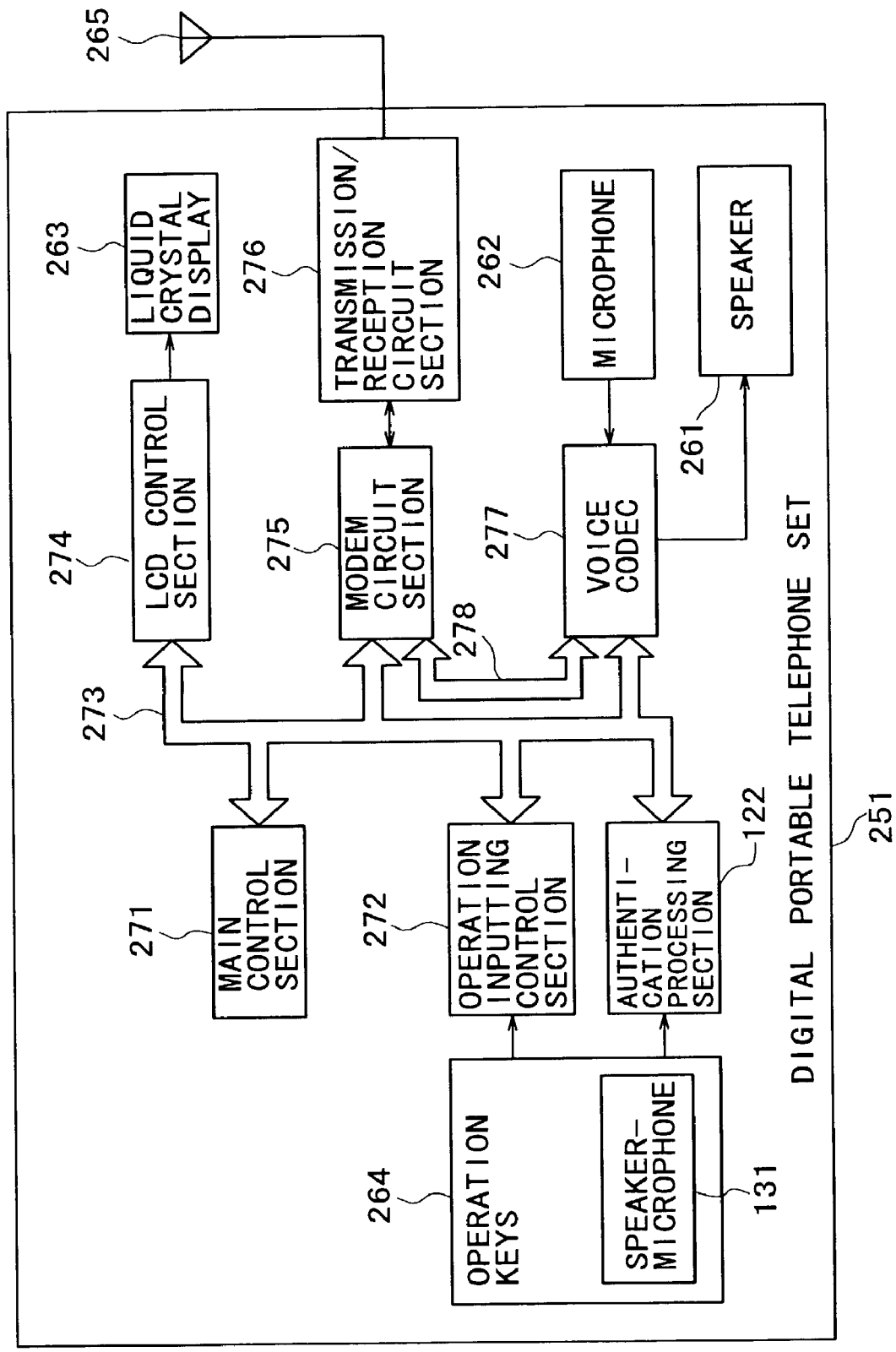
FIG. 30 is a block diagram showing a configuration of the digital portable telephone set of FIG. 29.

FIG. 30 shows an internal configuration of the digital portable telephone set 251.

Referring to FIG. 30, the digital portable telephone set 251 shown includes a main control section 271 for generally controlling the other components of the digital portable telephone set 251, an operation input control section 272, a liquid crystal display (LCD) control section 274, a modem circuit section 275, an authentication processing section 122 and a voice codec 277 connected to each other by a main bus 273. The modem circuit section 275 and the voice codec 277 are connected to each other by a synchronism bus 278.

The speaker-microphone 131 is connected to each of the operation keys 264, and an amplified pulse signal is supplied from the authentication processing section 122 to the speaker-microphone 131 and an impulse response is supplied from the speaker-microphone 131 to the authentication processing section 122. The authentication processing section 122 has a configuration described above with reference to FIG. 16 or 17, and executes a user identification process using an amplified impulse response supplied thereto from the speaker-microphone 131 and outputs a result of the identification to the main control section 271.

The main control section 271 of the digital portable telephone set 251 includes a CPU, a ROM, a RAM and so forth and discriminates based on an identification result of a user identification process inputted from the authentication processing section 122 whether or not an operation input is performed by a user registered in advance or whether or not an operation input for permitting use of the digital portable telephone set 251 by a user who is not registered is performed by a user registered in advance. If such an operation is performed, then the main control section 271 places the digital portable telephone set 251 into a use enabled state.

In particular, the digital portable telephone set 251 converts, in a voice communication mode, a voice signal collected by the microphone 262 into digital voice data by means of the voice codec 277. The modem circuit section 275 spectrum spread processes the digital voice data, and a transmission/reception circuit section 276 performs a digital to analog conversion process and a frequency conversion process for the spread spectrum digital voice data and transmits resulting data to a designated destination of communication through the antenna 265.

Further, in the voice communication mode, the digital portable telephone set 251 amplifies a reception signal received by the antenna 265 and performs a frequency conversion process and an analog to digital conversion process for the reception signal by means of the transmission/reception circuit section 276, and then despread spectrum processes resulting data by means of the modem circuit section 275, whereafter it converts resulting data into an analog voice signal by means of the voice codec 277. The digital portable telephone set 251 outputs voice corresponding to the analog voice signal by means of the speaker 261.

On the other hand, when the digital portable telephone set 251 transmits an electronic mail in a data communication mode, text data of an electronic mail inputted by operation of the operation keys 264 is signaled to the main control section 271 through the operation input control section 272. The main control section 271 controls the modem circuit section 275 to spectrum spread the text data and controls the transmission/reception circuit section 276 to perform a digital to analog conversion process and a frequency conversion process for the resulting spread spectrum data. Then, the electronic mail is transmitted to a base station through the antenna 265.

Further, when the digital portable telephone set 251 receives an electronic mail in the data communication mode, a reception signal received from a base station through the antenna 265 is spectrum despread by the modem circuit section 275 to restore original text data, and the original text data is outputted to the LCD control section 274. The LCD control section 274 controls the liquid crystal display section 263 to display the electronic mail.

The main control section 271 accepts registration by the user of and stores electronic mail addresses of, for example, a personal computer used usually by the user, digital portable telephone sets owned by families of the user and so forth. If such a situation that an identification result supplied from the authentication processing section 122 indicates that a user who is operating the digital portable telephone set 251 is not a registered user occurs successively by more than a predetermined number of times, then the main control section 271 determines that the digital portable telephone set 251 is being used by an unauthorized user and transmits a message of notification of such illegal use to the registered electronic mail address of the personal computer.

The main control section 271 may have, in addition to transmission of a message of notification of illegal use of the digital portable telephone set 251 to a registered electronic mail address, for example, such a function that a voice message for notification of illegal use is prepared in advance and the telephone number of some other telephone set used by the user or the telephone number of a telephone set used by a family of the user or the like is registered as a communication destination, and if such a situation that an identification result supplied from the authentication processing section 122 indicates that a user who is operating the digital portable telephone set 251 is not a registered user occurs successively by more than a predetermined number of times, then the main control section 271 determines that the digital portable telephone set 251 is being used by an unauthorized user and originates a telephone call to the registered telephone number to notify the user of such illegal use using such a method that a voice message for notification of an illegal use is used to perform a communication process.

Figure 31:
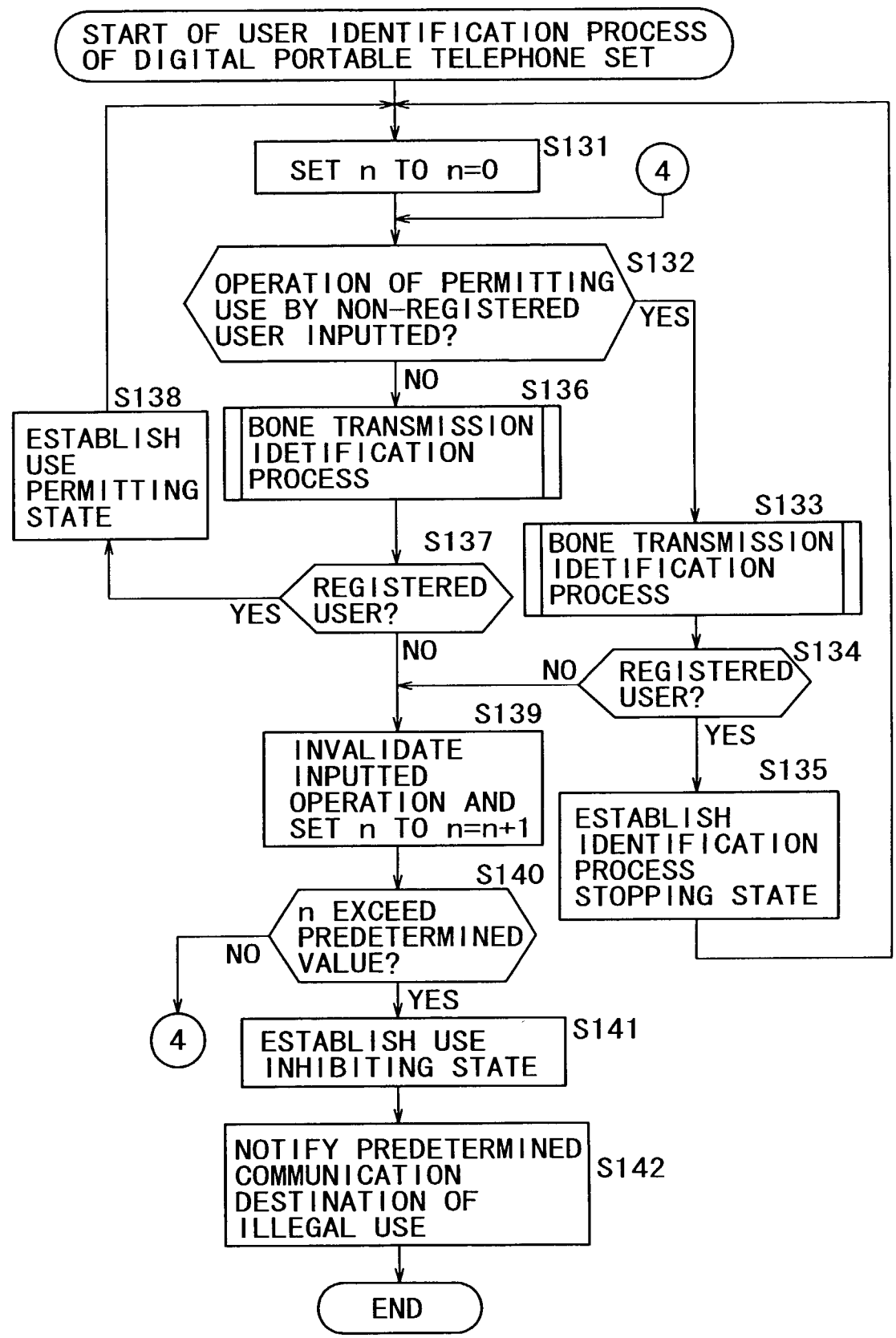
FIG. 31 is a flow chart illustrating a user identification process of the digital portable telephone set of FIG. 29.

Now, a user identification process executed by the digital portable telephone set 251 is described with reference to FIG. 31.

At step S131, the main control section 271 sets the value n, which represents the number of times by which the identification result supplied from the authentication processing section 122 indicates that the user who is using the digital portable telephone set 251 is not a registered user, to n=0.

At step S132, the main control section 271 discriminates whether or not an operation for permitting use by a non-registered user is inputted using the operation keys 264 through the operation input control section 272.

If it is discriminated at step S132 that an operation for permitting use by a non-registered user is inputted, then the main control section 271 controls, at step S133, the authentication processing section 122 to execute the bone transmission identification process described hereinabove with reference to the flow chart of FIG. 4.

At step S134, the authentication processing section 122 discriminates based on the identification result whether or not the person who has inputted the operation for permitting use by a non-registered user is a registered user. If it is discriminated at step S134 that the person is not a registered user, then the processing advances to step S139 which is hereinafter described.

If it is discriminated at step S134 that the person is a registered user, then the authentication processing section 122 establishes, at step S135, an identification process stopping state and notifies the main control section 271 that use of the cassette tape deck 151 should be permitted. The main control section 271 thus executes, for example, a communication process in accordance with an operation input of the user inputted from the operation keys 264 through the operation input control section 272, whereafter the processing returns to step S131 so that the processing at step S131 et seq. is repeated.

If it is discriminated at step S132 that an operation for permitting use by a non-registered user is not inputted but an ordinary operation input is performed, then the main control section 271 controls, at step S136, the authentication processing section 122 to execute the bone transmission identification process described hereinabove with reference to FIG. 4.

At step S137, the authentication processing section 122 discriminates based on the discrimination result whether or not the person who has inputted the operation is a registered user.

If it is discriminated at step S137 that the person who has inputted the operation is a registered user, then the authentication processing section 122 notifies, at step S138, the main control section 271 that use should be permitted. The main control section 271 executes, for example, a communication process in accordance with an operation input of the user inputted from the operation keys 264 through the operation input control section 272, whereafter the processing returns to step S131 so that the processing at step S131 et seq. is repeated.

If it is discriminated at step S134 that the person who has inputted the operation is not a registered user or if it is discriminated at step S137 that the person who has inputted the operation is not a registered user, then the authentication processing section 122 notifies, at step S139, the authentication processing section 122 that the identification result indicates that the person who has inputted the operation is not a registered user. The main control section 271 invalidates the inputted operation and increments the value n, which represents the number of times by which the identification result indicates that the user who is using the digital portable telephone set 251 is not a registered user, to n=n+1.

At step S140, the main control section 271 discriminates whether or not the value n which represents the number of times by which the identification result indicates that the user is not a registered user exceeds a predetermined value (for example, 3). If it is discriminated at step S140 that the value n which represents the number of times by which the identification result indicates that the user is not a registered user does not exceed the predetermined value, then the processing returns to step S132 so that the processing at step S132 et seq. is repeated.

If it is discriminated at step S140 that the value n which represents the number of times by which the identification result indicates that the user is not a registered user exceeds the predetermined value, then the main control section 271 determines, at step S141, that use of the digital portable telephone set 251 should be inhibited and controls, for example, the LCD control section 274 to cause the liquid crystal display section 263 to display a message for notification that use of the digital portable telephone set 251 is inhibited or invalidate a key operation of the operation keys 264.

At step S142, the main control section 271 transmits a message of notification of the illegal use to a predetermined communication destination registered in advance using an electronic mail, whereafter the processing is ended.

Through the process described above with reference to FIG. 31, it is discriminated based on an identification result of a user identification process inputted from the authentically processing section 122 whether or not an operation input is performed by a user registered in advance or whether or not an operation input for permitting use by a user who is not registered is performed by a user registered in advance and, when one of such operation inputs is performed, the digital portable telephone set 251 is placed into a state wherein it can be used normally, but when an operation input is performed by a user who is not registered by more than a predetermined number of times although an operation input for permitting use by a user who is not registered is performed, an electronic mail is used to transmit a message for notification of illegal use.

Further, if permission of use by a user who is not registered is limited only to talking, then the person who can access a received mail and the address list as well as an origination-termination history can be limited only to a registered user, and therefore, the privacy of the registered user can be prevented from being disturbed.

Meanwhile, if an address list is not stored in the body of the digital portable telephone set 251 but address list data of an individual person are stored in a server to which the digital portable telephone set 251 can be connected over the Internet or the like such that the individual person can access the server using the digital portable telephone set 251 only when the individual person is authenticated, then the person who can refer to the address list of the registered user can be limited to the user. In this instance, also when an individual person is authenticated using an apparatus which can perform a similar user identification process such as, for example, the personal computer 42 of FIG. 11, the individual person may be permitted to access the server in which the address list is stored.

Figure 32:
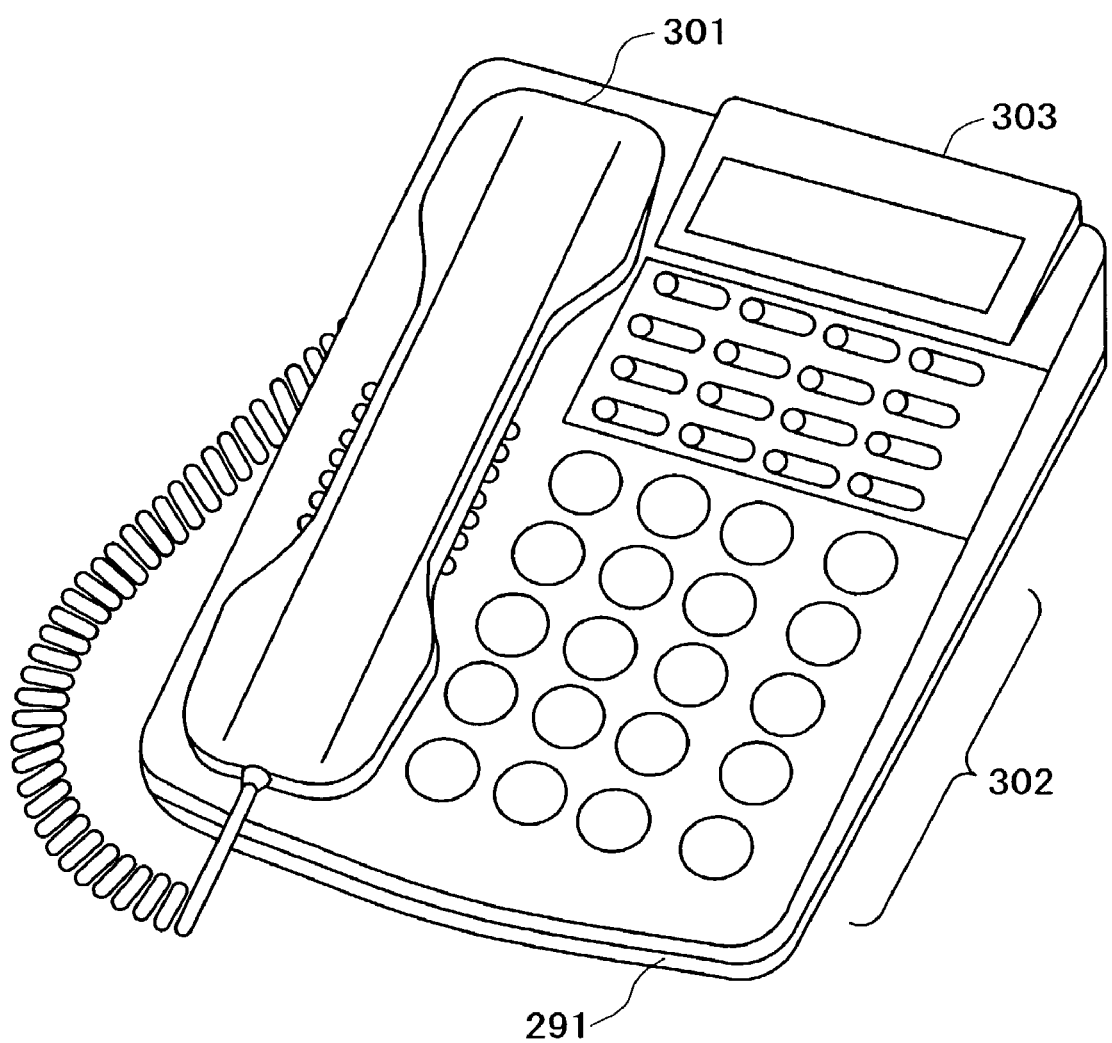
FIG. 32 is a perspective view showing an appearance of an installed telephone set to which the present invention is applied.

FIG. 32 shows an appearance of an installed telephone set 291 to which the present invention is applied.

Referring to FIG. 32, the installed telephone set 291 includes a telephone receiver 301, operation keys 302, and a speaker-microphone 131 and allows inputting of a telephone number and so forth using the operation keys 302. A liquid crystal display section 303 displays, for example, a telephone number of the other party of talking, a telephone charge, a message and so forth.

Figure 33:
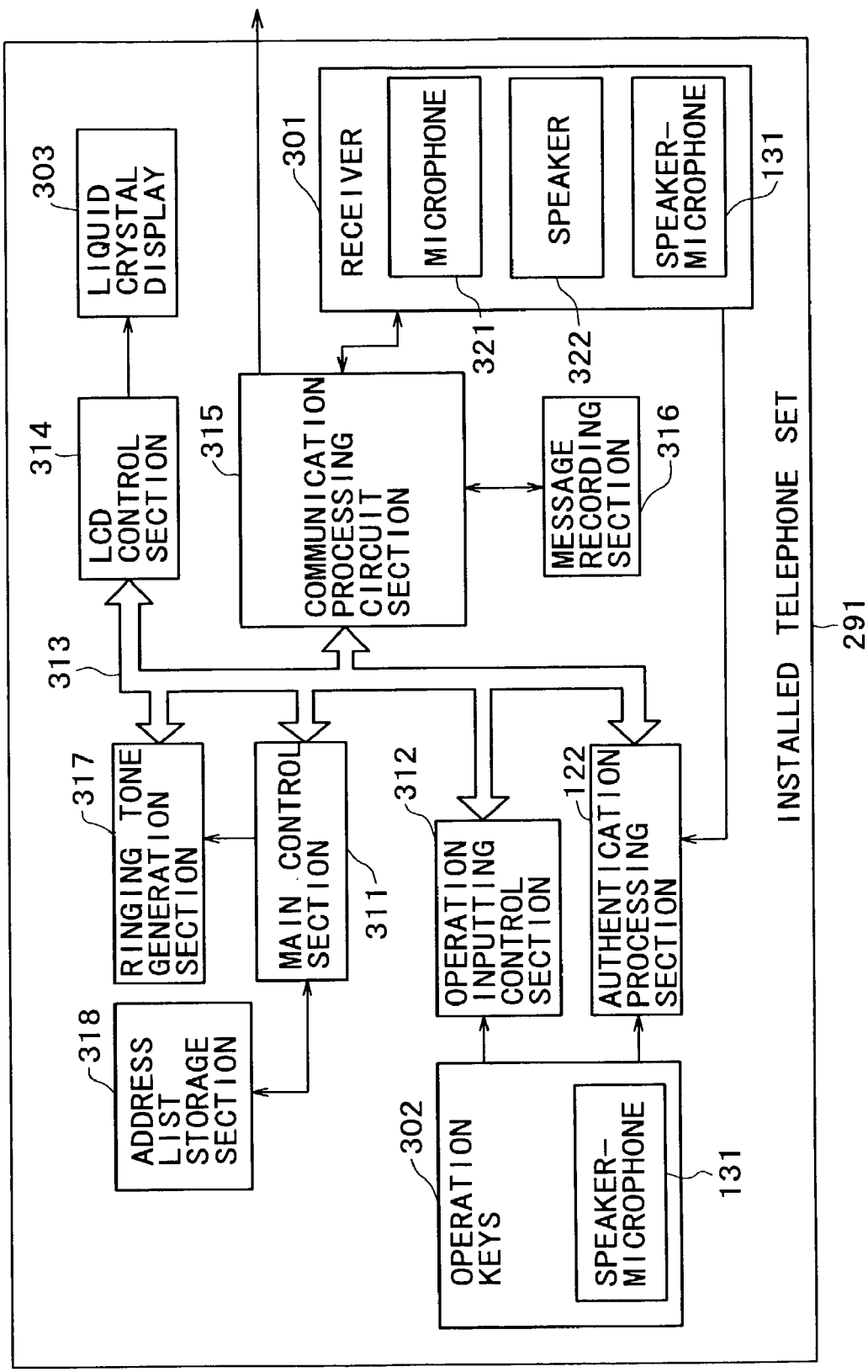
FIG. 33 is a block diagram showing a configuration of the installed telephone set of FIG. 32.

FIG. 33 shows a configuration of the installed telephone set 291.

Referring to FIG. 33, the installed telephone set 291 includes a main control section 311 for generally controlling components of the installed telephone set 291, an operation input control section 312, an authentication processing section 122, an LCD control section 314, a communication processing circuit section 315 and a ringing tone generation section 317 connected to each other by a bus 313.

A speaker-microphone 131 is connected to each of the operation keys 302 and the telephone receiver 301 such that an impulse response is supplied therefrom to the authentication processing section 122. The authentication processing section 122 has the configuration described hereinabove with reference to FIG. 16 or 17, and executes a user identification process using an amplified impulse response supplied from the speaker-microphone 131 and outputs a result of the identification to the main control section 311.

The main control section 311 of the installed telephone set 291 includes a CPU, a ROM, a RAM and so forth and discriminates based on an identification result of a user identification process inputted from the authentication processing section 122 whether or not an operation is performed by a user registered in advance. If the operation is performed by a user registered in advance, then voice collected by a microphone 321 of the telephone receiver 301 in a talking mode is processed by the communication processing circuit section 315 and transmitted. On the other hand, voice data received is converted into voice by a process of the communication processing circuit section 315 and outputted from a speaker 322 of the telephone receiver 301.

On the other hand, if it is discriminated by the authentication processing section 122 that an operation for originating a telephone call is performed by a user who is not registered in advance, then the main control section 311 places the installed telephone set 291 into a communication disabled state. In this time, the main control section 311 may control the LCD control section 314 to display on the liquid crystal display section 303 a message of notification that the intended telephone conversation is not permitted, or may control the communication processing circuit section 315, if the telephone receiver 301 is held by the user, to output from the speaker 322 of the telephone receiver 301 a message of notification that the telephone conversation is not permitted.

The installed telephone set 291 has a function of recording telephone numbers which are used frequently by the user and like information. The main control section 311 receives an inputting operation by the user using the operation keys 302 through the operation input control section 312 and controls an address list storage section 318 to store address list data including a telephone number and a corresponding name and so forth. Further, the main control section 311 controls the LCD control section 314 in accordance with an inputting operation performed by the user identified as a registered user using the operation keys 302 to display registered telephone numbers and names on the liquid crystal display section 303.

Furthermore, when the installed telephone set 291 receives a telephone call whose receiver is designated by an operation of an originating person who has originated the telephone call, it can generate a distinguishable ringing tone for the designated receiver. In particular, where the installed telephone set 291 is provided for utilization by a plurality of users in a home or the like, different ringing tones are assigned to the respective users so that the users can distinguish to whom a terminating telephone call is directed. In particular, the communication processing circuit section 315 extracts a signal for distinction of a receiver from a received signal and outputs the signal to the main control section 311. The main control section 311 controls the ringing tone generation section 317 based on the signal supplied thereto from the communication processing circuit section 315 and indicative of the designated receiver so that the ringing tone generation section 317 generates a ringing tone corresponding to the designated receiver.

Further, the installed telephone set 291 has an answering telephone function. Where the installed telephone set 291 is instructed of execution of the answering telephone function by the user in advance, if the telephone receiver 301 is not taken up even if a predetermined interval of time elapses after a ringing tone is generated by the processing of the ringing tone generation section 317 or if a user other than a user designated with the ringing tone by a process hereinafter described performs an operation input, then the communication processing circuit section 315 transmits a message for urging the originating person of the telephone call to record a message recorded in advance in a message recording section 316 to the call originating person and records a message sent back from the call originating person in response to the transmitted message into the message recording section 316. Further, the communication processing circuit section 315 reproduces the message recorded in the message recording section 316 in accordance with an operation input performed by the user using the operation keys 302 and outputs the reproduced message from the speaker 322 of the telephone receiver 301.

Further, in the installed telephone set 291, when a telephone call is to be originated therefrom, the user can set an upper limit to the period of time for utilization so that it cannot talk for more than the upper limit time period. In particular, the main control section 311 discriminates based on an identification result by the authentication processing section 122 whether or not a utilization time period is set for a user by whom the installed telephone set 291 is being used. If a utilization time period is set, then when the utilization time period set for the user in advance elapses, the main control section 311 controls the communication processing circuit section 315 to end the communication.

Figure 34:
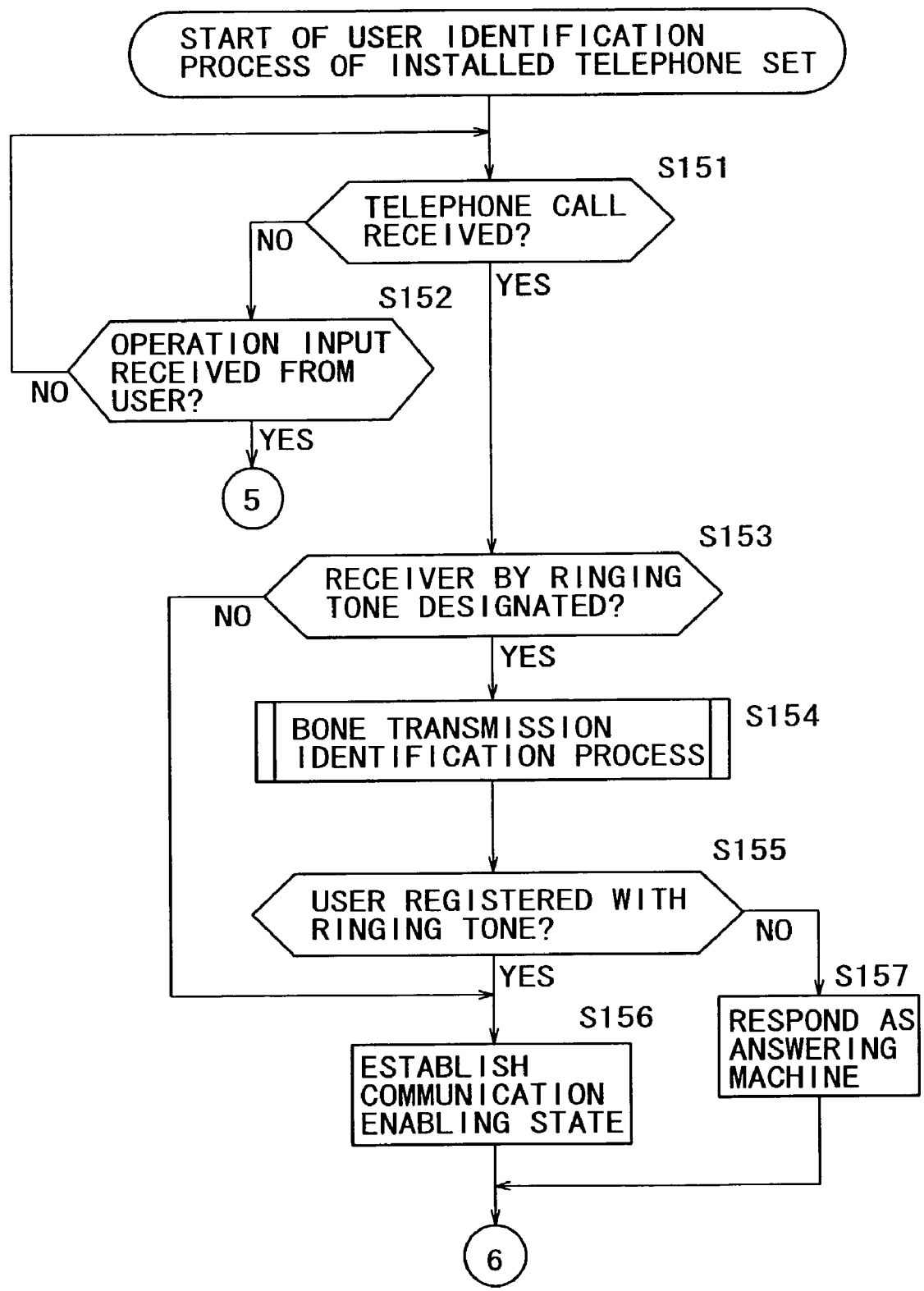
FIGS. 34 and 35 are flow charts illustrating a user identification process of the installed telephone set of FIG. 32.
Figure 35:
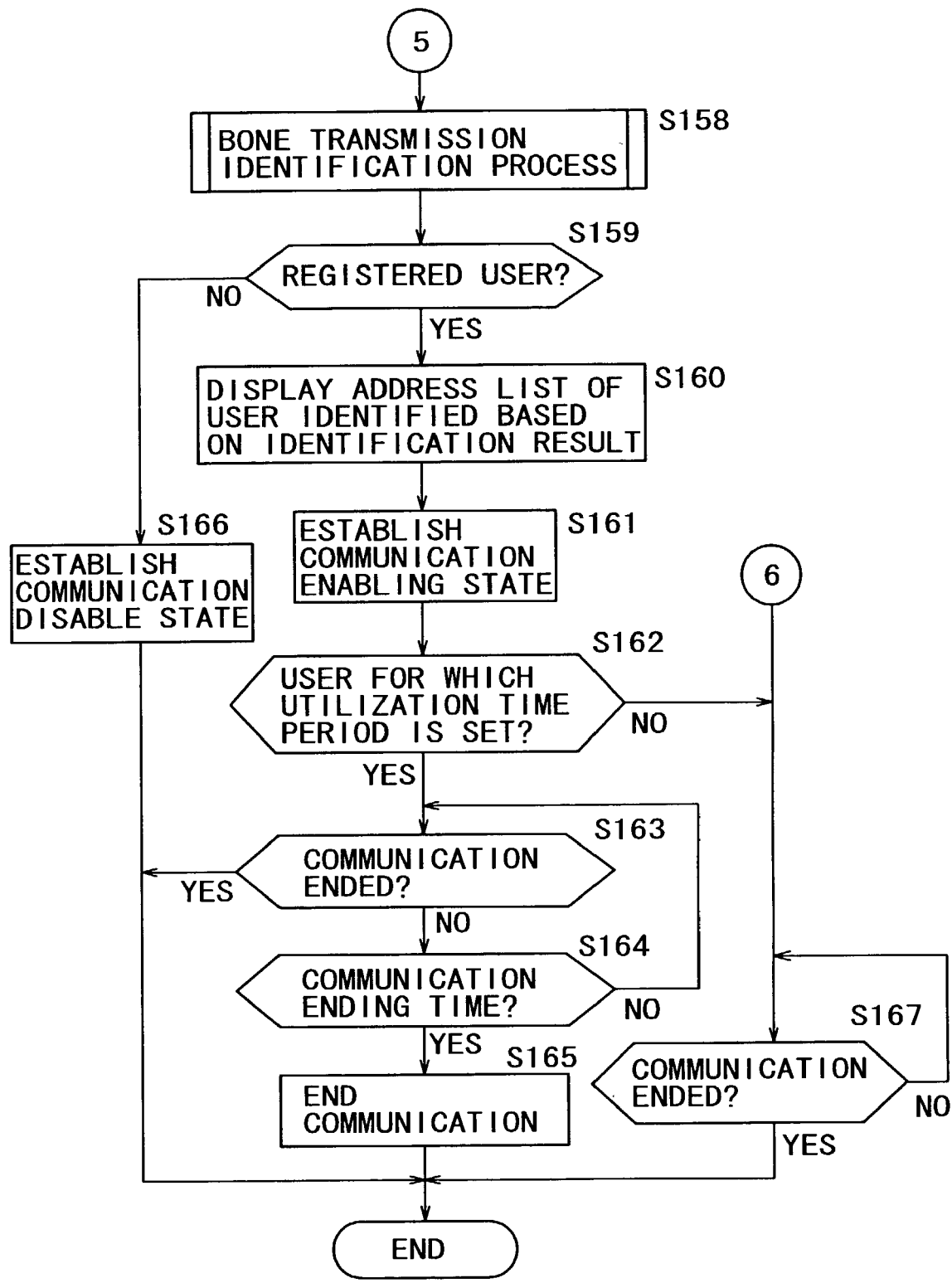

Now, a user identification process executed by the installed telephone set 291 is described with reference to FIGS. 34 and 35.

At step S151, the main control section 311 discriminates based on a signal supplied thereto from the communication processing circuit section 315 through the bus 313 whether or not a telephone call is received.

If it is discriminated at step S151 that a telephone call is not received, then the main control section 311 discriminates, at step S152, based on a signal supplied thereto from the operation input control section 312 through the bus 313 whether or not an operation input is received from the user. If it is discriminated at step S152 that an operation input is received from the user, then the processing advances to step S158 of FIG. 35 hereinafter described. If it is discriminated at step S152 that an operation input is not received from the user, then the processing returns to step S151 so that the processing at step S151 et seq. is repeated.

If it is discriminated at step S151 that a telephone call is received, then the main control section 311 discriminates, at step S153, based on a signal supplied from the communication processing circuit section 315 whether or not there is a designation of a receiver by a ringing tone.

If it is discriminated at step S153 that there is a designation of a receiver by a ringing tone, then when a user touches with the telephone receiver 301 or the operation keys 302, the bone transmission identification process described hereinabove with reference to FIG. 4 is executed at step S154.

At step S155, the main control section 311 discriminates based on an identification result supplied from the authentication processing section 122 whether or not the user who touches with the telephone receiver 301 or the operation keys 302 is a user registered with a ringing tone.

If it is discriminated at step S155 that the user is a user registered with a ringing tone, then the main control section 311 controls the pertaining components of the installed telephone set 291 to place the installed telephone set 291 into a communication enabling state at step S156.

If it is discriminated at step S155 that the user is not a user registered with a ringing tone, then the main control section 311 invalidates, at step S157, an operation input from the non-registered user and controls the communication processing circuit section 315 to execute an answering machine response.

If it is discriminated at step S152 that an operation input is received from the user, then the bone transmission identification process described hereinabove with reference to the flow chart of FIG. 4 is executed at step S158 of FIG. 35.

At step S159, the main control section 311 discriminates based on the identification result supplied from the authentication processing section 122 whether or not the user who has inputted the operation at step S152 is a registered user.

If it is discriminated at step S159 that the user is a registered user, then the main control section 311 reads out, at step S160, address data registered by the corresponding user from the address list storage section 318 based on the identification result and controls the LCD control section 314 to display the address list of the identified user on the liquid crystal display section 303. Then at step S161, the main control section 311 controls the pertaining components of the installed telephone set 291 to establish a communication enabling state.

At step S162, the main control section 311 discriminates whether or not the identified user is a user for which a utilization time period is set.

If it is discriminated at step S162 that the identified user is a user for which a utilization time period is set, then the main control section 311 discriminates, at step S163, based on a signal supplied thereto from the communication processing circuit section 315 whether or not the communication is ended. If it is discriminated at step S163 that the communication is ended, then the processing is ended.

If it is discriminated at step S163 that the communication is not ended, then the main control section 311 discriminates at step S164 whether or not the communication ending time of the identified user comes. If it is discriminated at step S164 that the communication ending time does not come, then the processing returns to step S163 to repeat the processing at step S163 et seq.

If it is discriminated at step S164 that the communication ending time comes, then the main control section 311 controls, at step S165, the pertaining components of the installed telephone set 291 to end the communication, thereby ending the processing. It is to be noted that, before the main control section 311 ends the communication at step S165, for example, it may control the LCD control section 314 to display the remaining communication time period on the liquid crystal display section 303 to urge the user to end its communication within the communication time period.

If it is discriminated at step S159 that the user is not a registered user, then the main control section 311 controls, at step S166, the pertaining components of the installed telephone set 291 to establish a communication disabling state, thereby ending the processing. At this time, the main control section 311 may control the LCD control section 314 to display on the liquid crystal display section 303 a message for notification that the communication cannot be continued any more.

After the process at step S156 comes to an end or after the process at step S157 comes to an end or else when it is discriminated at step S162 that the user is not a user for whom a utilization time period is set, the main control section 311 discriminates, at step S167, based on a signal supplied thereto from the communication processing circuit section 315 whether or the communication is ended.

If it is discriminated at step S167 that the communication is not ended, then the process at step S167 is repeated until it is discriminated that the communication is ended. If it is discriminated at step S167 that the communication is ended, then the processing is ended.

Through the process described above with reference to FIGS. 34 and 35, by performing personal identification of a user who utilizes the installed telephone set 291 which is provided for use by a plurality of users such as, for example, families, it is possible not only to prevent a non-registered user from utilizing the installed telephone set 291 but also to prevent a telephone call destined for a predetermined user from being received by another user and besides to set an upper limit to a communication time period for each user.

Further, with the installed telephone set 291, even if an authentication process is performed only when the telephone receiver 301 is touched at first or when the operation keys 302 are depressed, the same person may not use the installed telephone set 291 continuously, and therefore, the authentication processing section 122 may perform a personal identification process periodically using an impulse response supplied from the speaker-microphone 131 of the telephone receiver 301. Further, if an impulse response is acquired periodically, then personal data registered may be updated when necessary.

Further, if a utilization history of the installed telephone set 291 is stored for each registered user, then it is possible to calculate a telephone charge for each individual person or transmit such calculation results to a communication undertaker so that a bill may be prepared for each individual person by the communication undertaker and have the telephone charge for each of the registered users paid by the user. Further, if a personal identification process is performed periodically also during communication as described above, then even if the person who utilizes the installed telephone set 291 changes, the telephone charge for each user can be calculated accurately.

Some other applications of the present invention are described below.

If the speaker-microphone 131 is applied to an inputting device such as, for example, a keyboard or a mouse of an ordinary personal computer, then it is possible to identify an individual person during an input operation such as key inputting. Consequently, for example, when network shopping or the like is to be utilized, personal identification can be performed without the necessity for the user to perform a special operation while the user inputs required information, and if the inputted personal information does not coincide with a result of the personal identification, then ordering can be cancelled. Further, if the personal identification is used together with some other security information such as a credit card number or a password, then the security can be further strengthened.

Further, if the speaker-microphone 131 is applied to the surface of a touch panel of an ATM of a bank or the like, then personal identification can be performed without the necessity for the user to perform a special operation while the user performs an inputting operation of inputting required information using the touch panel, and if a result of the personal identification does not coincide with owner information recorded on a cash card or a magnetic tape of a deposit certificate, then dispensing of cash can be inhibited. Also in this instance, if the personal identification is used together with some other security information such as a password or a personal identification number, then the security can be further strengthened.

Furthermore, the personal identification can be utilized in place of a signature when a credit card is used. For example, an authentication processing apparatus including the speaker-microphone 131 is installed in a shop, and a credit card number of a user identified by the personal identification process of the authentication processing apparatus is displayed on a display apparatus provided on the authentication apparatus. Then, the number of the credit card which the user intends to use and the credit card number based on the result of the personal identification are compared with each other, and only when they coincide with each other, a settlement process in which the credit card is used is performed. Further, it is possible similarly to apply the speaker-microphone 131 to a predetermined portion of a bicycle and permit unlocking only when a result of personal identification indicates that an authorized person tries to use the bicycle. Thus, it is possible to prevent illegal use of a credit card when a user lost a credit card or to prevent a bicycle from being used illegally by an ill-intentioned third party.

In this manner, if a personal identification process based on bone transmission is performed in place of or in addition to conventional personal identification or conventional security that uses a lock and a key, the security can be further strengthened.

The series of processes described above may otherwise be executed by software. Where the series of processes is executed by software, a program that constructs the software is installed from a program storage medium into a computer incorporated in hardware for exclusive use or, for example, a personal computer for general purpose that can execute various functions by installing various programs.

The program storage medium in this instance is formed as a package medium such as, as shown in FIG. 13, a magnetic disk 81 (including a flexible disk), an optical disk 82 (including a CD-ROM (Compact Disk-Read Only Memory) and a DVD (Digital Versatile Disk)), or a magneto-optical disk 83 (including an MD (Mini-Disk) (trademark)), or a semiconductor memory 84 which has the program recorded thereon or therein and is distributed in order to provide the program separately from a computer to a user.

It is to be noted that, in the present specification, the steps which describe the program stored in a program storage medium may be but need not necessarily be processed in a time series in the order as described, and include processes which are executed in parallel or individually without being processed in a time series.

While preferred embodiments of the present invention have been described using specific terms, such description is for illustrative purposes only, and it is to be understood that changes and variations may be made without departing from the spirit or scope of the following claims.

What is claimed is:

1. A personal identification apparatus for identifying a person, comprising:
   generation means for generating an acoustic pulse signal;
   first outputting means for outputting the acoustic pulse signal generated by said generation means;
   reception means for receiving an impulse response obtained when the acoustic pulse signal outputted from said first outputting means is transmitted through a living organism of the person;
   comparison means for comparing said impulse response received by said reception means with a reference signal of the person; and
   production means for synthesizing the acoustic pulse signal generated by said generation means and the impulse received by said reception means to produce a composite wave.

2. A personal identification apparatus according to claim 1, wherein said first outputting means and said reception means are configured to allow the person to hold at least a portion of the living organism therebetween.

3. A personal identification apparatus according to claim 1, wherein
   said first outputting means and said reception means are arranged to form two adjacent surfaces so that at least a portion of the living organism of the person can touch both said first outputting means and the reception means.

4. A personal identification apparatus according to claim 1, wherein
   said first outputting means and said reception means are provided on a common probe-like member.

5. A personal identification apparatus according to claim 1, wherein
   said first outputting means and said reception means are formed as a common member including a flat surface.

6. A personal identification apparatus according to claim 1, further comprising:
   second outputting means for outputting the composite wave produced by said production means.

7. A personal identification apparatus according to claim 1, further comprising:
   inputting means for inputting information for identifying a registered user;
   recording means for recording the information inputted by said inputting means for identifying the registered user and for recording a first composite wave produced by said production means in a coordinated relationship with each other;
   comparison means for comparing the first composite wave recorded by said recording means, the first composite wave corresponding to the registered user and a second composite wave produced by said production means with each other, the second composite wave corresponding to the person; and
   second outputting means for outputting a result of the comparison by said comparison means.

8. A personal identification apparatus according to claim 7, wherein
   said comparison means compares attenuation characteristics of the first composite wave recorded by said recording means, the first composite wave corresponding to the registered user and the second composite wave produced by said production means with each other using the acoustic pulse signal as a reference for a time axis.

9. A personal identification apparatus according to claim 8, wherein
   said comparison means calculates a square mean value of differences in amplitude between the first composite wave corresponding to the registered user and the second composite wave produced by said production means to compare the attenuation characteristics with each other.

10. A personal identification apparatus according to claim 7, wherein
    said comparison means compares frequency characteristics of the first composite wave recorded by said recording means and corresponding to the registered user and the second composite wave produced by said production means with each other.

11. A personal identification apparatus according to claim 10, further comprising:
    spectrum conversion means for executing spectrum conversion of the composite wave produced by said production means after a predetermined time interval,
    wherein said recording means further records the information inputted by said inputting means for identifying the registered user and a first spectrum conversion result obtained by the spectrum conversion executed for the first composite wave by said spectrum conversion means in a coordinated relationship with each other, and
    said comparison means compares the first spectrum conversion result recorded by said recording means and a second spectrum conversion result obtained by the spectrum conversion executed for the second composite waveform by said spectrum conversion means with each other to compare frequency characteristics of the first composite wave corresponding to the registered user and the second composite wave corresponding to the person produced by said production means with each other.

12. A personal identification method for identifying a person, comprising:
   generating an acoustic pulse signal;
   outputting the acoustic pulse signal generated by said generating;
   receiving an impulse response obtained when the acoustic pulse signal provided by said outputting is transmitted through a living organism of the person;
   comparing the impulse response of said receiving with a reference signal of the person; and
   producing a composite wave by synthesizing the acoustic pulse signal of said generating and synthesizing the impulse response of said receiving.

13. A computer readable medium encoded with processor readable instructions that when executed by the processor performs a process of identifying a person the instructions comprising:
   a first computer code for generating an acoustic pulse signal;
   a second computer code for outputting the acoustic pulse signal provided by said generating; and
   a third computer code for receiving an impulse response obtained by said outputting of the acoustic pulse signal when transmitted through a living organism of the person;
   a fourth computer code for comparing the impulse response of said receiving with a reference signal of the person; and
   a fifth computer code for producing a composite wave by synthesizing the acoustic pulse signal of said generating and synthesizing the impulse response of said receiving.

14. An information processing apparatus for identifying a person based on acquired information, comprising:
   acquisition means for acquiring a composite wave of an impulse response, the impulse response obtained by applying a pulse signal to a living organism of the person;
   inputting means for inputting information for identifying a registered user;
   recording means for recording the information inputted by said inputting means for identifying the registered user and a first composite wave acquired by said acquisition means in a coordinated relationship with each other;
   comparison means for comparing the first composite wave recorded by said recording means, the first composite wave corresponding to the registered user and a second composite wave acquired by said acquisition means with each other, the second composite wave corresponding to the person; and
   outputting means for outputting a result of the comparison by said comparison means.

15. An information processing apparatus according to claim 14, wherein
   said comparison means compares attenuation characteristics of the first composite wave recorded by said recording means and corresponding to the registered user and the second composite wave acquired by said acquisition means with each other using the pulse signal as a reference for a time axis.

16. An information processing apparatus according to claim 15, wherein
   said comparison means calculates a square mean value of differences in amplitude between the first composite wave corresponding to the registered user and the second composite wave corresponding to the person acquired by said acquisition means to compare the attenuation characteristics with each other.

17. An information processing apparatus according to claim 14, wherein
   said comparison means compares frequency characteristics of the first composite wave recorded by said recording means and corresponding to the registered user and the second composite wave corresponding to the person acquired by said acquisition means with each other.

18. An information processing apparatus according to claim 17, further comprising spectrum conversion means for executing spectrum conversion of the composite wave acquired by said acquisition means after a predetermined time interval,
   wherein said recording means further records the information inputted by said inputting means for identifying the registered user and a first spectrum conversion result obtained by the spectrum conversion executed for the first composite wave by said spectrum conversion means in a coordinated relationship with each other, and
   said comparison means compares the first spectrum conversion result recorded by said recording means and a second spectrum conversion result obtained by the spectrum conversion executed for the second composite waveform by said spectrum conversion means with each other to compare frequency characteristics of the first composite wave corresponding to the registered user and the second composite wave acquired by said acquisition means with each other.

19. An information processing method for identifying a person based on acquired information, comprising:
   first acquiring a first composite wave of a first impulse response, the first impulse response obtained by applying a pulse signal to a living organism of the person;
   inputting information for identifying a registered user;
   recording the information of the inputting for identifying the registered user;
   second acquiring a second composite wave of a second impulse response, the second impulse response obtained by applying a pulse signal to a living organism of the registered user, the second acquiring being performed in a coordinated relationship with the information of the inputting;
   comparing the first composite wave, the first composite wave corresponding to the person and the second composite wave, corresponding to the registered user with each other; and
   outputting a result of the comparing.

20. A computer-readable medium encoded with instructions for an information processing apparatus, the information processing apparatus performing a process of identifying a person when executing the instructions, the process comprising:
   first acquiring a first composite wave of a first impulse response, the first impulse response obtained by applying a pulse signal to a living organism of the person;
   inputting information for identifying a registered user;
   recording the information of the inputting for identifying the registered user;

second acquiring a second composite wave of a second impulse response, the second impulse response obtained by applying a pulse signal to a living organism of the registered user, the second acquiring being performed in a coordinated relationship with the information of the inputting;

comparing the first composite wave, the first composite wave corresponding to the person and the second composite wave corresponding to the registered user with each other; and outputting a result of the comparing.

21. A personal identification system, comprising:

a first information processing apparatus configured to acquire information for executing personal identification; and a second information apparatus configured to execute a personal identification process based on the information acquired by said first information processing apparatus;

wherein said first information processing apparatus includes, generation means for generating a pulse signal, first outputting means for outputting the pulse signal generated by said generation means, reception means for receiving an impulse obtained when the pulse signal outputted from said first outputting means is transmitted through a living organism of a user, production means for synthesizing the pulse signal generated by said generation means and the impulse received by said reception means to produce a composite wave, and second outputting means for outputting the composite wave produced by said production means;

and wherein said second information processing apparatus includes, acquisition means for acquiring the composite wave outputted by said second outputting means, inputting means for inputting information for identifying a registered user, recording means for recording the information inputted by said inputting means for identifying the registered user and a first composite wave acquired by said acquisition means in a coordinated relationship with each other, comparison means for comparing the first composite wave recorded by said recording means in advance and corresponding to the registered user and a second composite wave acquired by said acquisition means with each other, and third outputting means for outputting a result of the comparison by said comparison means.

* * * * *

UNITED STATES PATENT AND TRADEMARK OFFICE
CERTIFICATE OF CORRECTION

| | | |
|---|---|---|
| PATENT NO. | : 7,123,752 B2 | Page 1 of 1 |
| APPLICATION NO. | : 10/306407 | |
| DATED | : October 17, 2006 | |
| INVENTOR(S) | : Yumi Kato et al. | |

It is certified that error appears in the above-identified patent and that said Letters Patent is hereby corrected as shown below:

Column 5, line 16, insert --are-- after "elements".

Column 35, lines 10-11, insert --generated-- before "acoustic", delete all after "signal" except semi-colon.

Column 35, line 19, delete "of said receiving".

Column 35, lines 37-38, delete "of said receiving".

Signed and Sealed this

Twenty-second Day of May, 2007

JON W. DUDAS
*Director of the United States Patent and Trademark Office*